(12) United States Patent
Mays et al.

(10) Patent No.: US 12,475,168 B1
(45) Date of Patent: Nov. 18, 2025

(54) COMPUTING SYSTEMS AND DEVICES FOR HASHMAP CONTROL OF COMPUTING OPERATIONS

(71) Applicant: SAS Institute Inc., Cary, NC (US)

(72) Inventors: Aaron Samuel Mays, Angier, NC (US); Michael Stephen Whitcher, Apex, NC (US); Andrew William Henrick, Holly Springs, NC (US); Raghavendra Rao Kurada, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/244,253

(22) Filed: Jun. 20, 2025

Related U.S. Application Data

(60) Provisional application No. 63/766,181, filed on Mar. 3, 2025, provisional application No. 63/758,799, filed on Feb. 14, 2025.

(51) Int. Cl.
  *G06F 16/901* (2019.01)
(52) U.S. Cl.
  CPC ............. *G06F 16/9014* (2019.01)
(58) Field of Classification Search
  None
  See application file for complete search history.

(56) References Cited

U.S. PATENT DOCUMENTS

| | | | | |
|---|---|---|---|---|
| 10,268,459 | B1 * | 4/2019 | Christian | G06N 20/00 |
| 10,664,470 | B1 * | 5/2020 | Forghani | G06F 16/221 |
| 2018/0336263 | A1 * | 11/2018 | Bensberg | G06F 16/284 |
| 2018/0375772 | A1 * | 12/2018 | Wickeraad | H04L 47/80 |
| 2021/0405969 | A1 * | 12/2021 | Nagasaka | G06F 9/30036 |
| 2022/0277010 | A1 * | 9/2022 | Zhou | G06F 16/24556 |

OTHER PUBLICATIONS

Conte, S., et al., "Elementary Numerical Analysis an Algorithmic Approach", pp. 294-303, Third Edition, McGraw-Hill Book Company.

Fornberg, B., et al., "Generation of Finite Difference Formulas or Arbitrarily Spaced Grids", Oct. 1988, vol. 51, No. 184, pp. 699-706, American Mathematical Society.

Owen, J., et al. "Introduction to Population Pharmacokinetic/Pharmacodynamic Analysis with Nonlinear Mixed Effects Models", pp. 1-5, Wiley.

* cited by examiner

*Primary Examiner* — Aleksandr Kerzhner
*Assistant Examiner* — Anugeetha Kunjithapatham
(74) *Attorney, Agent, or Firm* — COATS & BENNETT, PLLC

(57) ABSTRACT

A computing device receives a request to generate computing operations to effectuate a response for a function to an input set. The device generates a hashmap data structure. The hashmap data structure indexes respective data storage associated with a respective key of one or more keys. The device generates a first set of computing instructions to solve a first component for the function, executes the first set of computing instructions, and generates a first hash key. The first hash key represents multiple executions of the first set of computing instructions. The device stores the first hash key in the hashmap data structure to index a storage location in the hashmap data structure, generates a second set of computing instructions to solve a second component for the function, and executes the second set of computing instructions by using the first hash key to retrieve data indexed by the first hash key.

30 Claims, 43 Drawing Sheets

| Hash Map 1680 | |
|---|---|
| Key 1682 | Value 1684 |
| f '(x+h) | Derivative Link for f(x) |
| f ''(x+h2) | Derivative Link for f(x) |
| f '''(x+h3) | Derivative Link for f(x) |
| f ''''(x+h4) | Derivative Link for f(x) |
| f '''''(x+h5) | Derivative Link for f(x) |
| f ''''''(x+h6) | Derivative Link for f(x) |

FIG. 16E

| Derivative | Accuracy | 0 | 1 | 2 | 3 | 4 | 5 | 6 | 7 | 8 |
|---|---|---|---|---|---|---|---|---|---|---|
| 1 | 1 | -1 | 1 | | | | | | | |
| | 2 | -3/2 | 2 | -1/2 | | | | | | |
| | 3 | -11/6 | 3 | -3/2 | 1/3 | | | | | |
| | 4 | -25/12 | 4 | -3 | 4/3 | -1/4 | | | | |
| | 5 | -137/60 | 5 | -5 | 10/3 | -5/4 | 1/5 | | | |
| | 6 | -49/20 | 6 | -15/2 | 20/3 | -15/4 | 6/5 | -1/6 | | |
| 2 | 1 | 1 | -2 | 1 | | | | | | |
| | 2 | 2 | -5 | 4 | -1 | | | | | |
| | 3 | 35/12 | -26/3 | 19/2 | -14/3 | 11/12 | | | | |
| | 4 | 15/4 | -77/6 | 107/6 | -13 | 61/12 | -5/6 | | | |
| | 5 | 203/45 | -87/5 | 117/4 | -254/9 | 33/2 | -27/5 | 137/180 | | |
| | 6 | 469/90 | -223/10 | 879/20 | -949/18 | 41 | -201/10 | 1019/180 | -7/10 | |
| 3 | 1 | -1 | 3 | -3 | 1 | | | | | |
| | 2 | -5/2 | 9 | -12 | 7 | -3/2 | | | | |
| | 3 | -17/4 | 71/4 | -59/2 | 49/2 | -41/4 | 7/4 | | | |
| | 4 | -49/8 | 29 | -461/8 | 62 | -307/8 | 13 | -15/8 | | |
| | 5 | -967/120 | 638/15 | -3929/40 | 389/3 | -2545/24 | 268/5 | -1849/120 | 29/15 | |
| | 6 | -801/80 | 349/6 | -18353/120 | 2391/10 | -14557/6 | 4891/30 | -561/8 | 527/30 | -469/240 |
| 4 | 1 | 1 | -4 | 6 | -4 | 1 | | | | |
| | 2 | 3 | -14 | 26 | -24 | 11 | -2 | | | |
| | 3 | 35/6 | -31 | 137/2 | -242/3 | 107/2 | -19 | 17/6 | -7/2 | |
| | 4 | 28/3 | -111/2 | 142 | -1219/6 | 176 | -185/2 | 82/3 | | |
| | 5 | 1069/80 | -1316/15 | 15289/60 | -2144/5 | 10993/24 | -4772/15 | 2803/20 | -536/15 | 967/240 |

FIG. 17B
*Prior Art*

```
---Program Execution Starting.

1 (566:27) rc=_DELTA_.SETACCURACY( 1 ) = 0
1 (567:24) rc=_DELTA_.SETACCURACY( 1, 0.00001 ) = 0
1 (568:24) rc=_DELTA_.SETACCURACY( 2, 0.0001 ) = 0
1 (569:24) rc=_DELTA_.SETACCURACY( 3, 0.001 ) = 0
1 (571:3)  x=5
```

```
--- function foo Execution Starting.
1  (561:8)   ##dbl1 = (x=5) * (x=5) = 25
1  (561:10)  ##dbl2 = (##dbl1=25) * (x=5) = 125
1  (561:12)  y = (##dbl2=125) * (x=5) = 625
1  (562:10)  _foo_ = (y=625) = 625
--- function foo Execution Finished.
```
1820
1822
1824

```
1  (572:8)  y = foo( x=5 ) = 625
```

```
1  (572:8)  @1dt1_1 = - (y=625) = -625
1  (572:8)  @1dt1_2 = (x=5) + (__DELTA__.delta1=0.00001) = 5.00001
```

```
--- function foo Execution Starting.
1  (561:8)   ##dbl1 = (x=5.00001) * (x=5.00001) = 25.0001
1  (561:10)  ##dbl2 = (##dbl1=25.0001) * (x=5.00001) = 125.00075
1  (561:12)  y = (##dbl2=125.00075) * (x=5.00001) = 625.00500001
1  (562:10)  _foo_ = (y=625.00500001) = 625.00500001
--- function foo Execution Finished.
```
1825

```
1  (572:8)  @1dt1_3 = foo( @1dt1_2=5.00001 ) = 625.00500001
1  (572:8)  @1dt1_4 = (@1dt1_3=625.00500001) - (y=625) = 0.005000015
```
1827

```
1  (572:8)  @y/@x = (@1dt1_4=0.005000015) / (__DELTA__.delta1=0.00001) = 500.00149998
```

```
1  (572:8)  @2dt1_1 = - (@y/@x=500.00149998) = -500.0015
1  (572:8)  @2dt1_2 = 2 * (__DELTA__.delta2=0.0001) = 0.0002
1  (572:8)  @2dt1_3 = (x=5) + (__DELTA__.delta2=0.0001) = 5.0001
```

FIG. 18C

```
--- function foo Execution Starting.
1  (561:8)   ##dbl1 = (x=5.0001) * (x=5.0001) = 25.00100001
1  (561:10)  ##dbl2 = (##dbl1=25.00100001) * (x=5.0001) = 125.00750015
1  (561:12)  y = (##dbl2=125.00750015) * (x=5.0001) = 625.0500015
1  (562:10)  _foo_ = (y=625.0500015) = 625.0500015
--- function foo Execution Finished.

1  (572:8)  @2dt1_4 = foo( @2dt1_3=5.0001 ) = 625.0500015
1  (572:8)  @2dt1_5 = (@2dt1_4=625.0500015) * -2 = -1250.100003
1  (572:8)  @2dt1_6 = (y=625) + (@2dt1_5=-1250.100003) = -625.100003
1  (572:8)  @2dt1_7 = (x=5) + (@2dt1_2=0.0002) = 5.0002

--- function foo Execution Starting.
1  (561:8)   ##dbl1 = (x=5.0002) * (x=5.0002) = 25.00200004
1  (561:10)  ##dbl2 = (##dbl1=25.00200004) * (x=5.0002) = 125.0150006
1  (561:12)  y = (##dbl2=125.0150006) * (x=5.0002) = 625.100006
1  (562:10)  _foo_ = (y=625.100006) = 625.100006
--- function foo Execution Finished.

1  (572:8)  @2dt1_8 = foo( @2dt1_7=5.0002 ) = 625.100006
1  (572:8)  @2dt1_9 = (@2dt1_6=-625.100003) + (@2dt1_8=625.100006) = 3.0001204E-6
1  (572:8)  @2dt1_10 = (@2dt1_9=3.0001204E-6) / (__DELTA__.delta2=0.0001) = 0.0300012039
1  (572:8)  @@y/@x/@x = (@2dt1_10=0.0300012039) / (__DELTA__.delta2=0.0001) = 300.01203868
1  (572:8)  @3dt1_1 = - (@@y/@x/@x=300.01203868) = -300.0120387
1  (572:8)  @3dt1_2 = 2 * (__DELTA__.delta3=0.001) = 0.002
1  (572:8)  @3dt1_3 = 3 * (__DELTA__.delta3=0.001) = 0.003
1  (572:8)  @3dt1_5 = (x=5) + (__DELTA__.delta3=0.001) = 5.001
```

FIG. 18D

```
---  function foo Execution Starting.
 1   (561:8)  ##dbl1 = (x=5.001) * (x=5.001) = 25.010001
 1   (561:10) ##dbl2 = (##dbl1=25.010001) * (x=5.001) = 125.075015
 1   (561:12) y = (##dbl2=125.075015) * (x=5.001) = 625.50015002
 1   (562:10) _foo_ = (y=625.50015002) = 625.50015002
---  function foo Execution Finished.

1   (572:8)  @3dt1_6 = foo( @3dt1_5=5.001 ) = 625.50015002
 1   (572:8)  @3dt1_7 = (@3dt1_6=625.50015002) * 3 = 1876.5004501
 1   (572:8)  @3dt1_8 = (@3dt1_7=1876.5004501) - (y=625) = 1251.5004501
 1   (572:8)  @3dt1_9 = (x=5) + (@3dt1_2=0.002) = 5.002

---  function foo Execution Starting.
 1   (561:8)  ##dbl1 = (x=5.002) * (x=5.002) = 25.020004
 1   (561:10) ##dbl2 = (##dbl1=25.020004) * (x=5.002) = 125.15006001
 1   (561:12) y = (##dbl2=125.15006001) * (x=5.002) = 626.00060016
 1   (562:10) _foo_ = (y=626.00060016) = 626.00060016
---  function foo Execution Finished.

1   (572:8)  @3dt1_10 = foo( @3dt1_9=5.002 ) = 626.00060016
 1   (572:8)  @3dt1_11 = (@3dt1_10=626.00060016) * -3 = -1878.0018
 1   (572:8)  @3dt1_12 = (@3dt1_8=1251.5004501) + (@3dt1_11=-1878.0018) = -626.5013504
 1   (572:8)  @3dt1_13 = (x=5) + (@3dt1_3=0.003) = 5.003
```

FIG. 18E

```
--- function foo Execution Starting.
 1  (561:8)   ##dbl1 = (x=5.003) * (x=5.003) = 25.030009
 1  (561:10)  ##dbl2 = (##dbl1=25.030009) * (x=5.003) = 125.22513503
 1  (561:12)  y = (##dbl2=125.22513503) * (x=5.003) = 626.50135054
 1  (562:10)  _foo__ = (y=626.50135054) = 626.50135054
--- function foo Execution Finished.
 1  (572:8)   @3dt1_14 = foo( @3dt1_13=5.003 ) = 626.50135054
 1  (572:8)   @3dt1_15 = (@3dt1_12=-626.5013504) + (@3dt1_14=626.50135054) = 1.2003682E-7
 1  (572:8)   @3dt1_16 = (@3dt1_15=1.2003682E-7) / (_DELTA__.delta3=0.001) = 0.0001200368
 1  (572:8)   @3dt1_17 = (@3dt1_16=0.0001200368) / (_DELTA__.delta3=0.001) = 0.120036816
 1  (572:8)   @@@y/@x/@x = (@3dt1_17=0.120036816) / (_DELTA__.delta3=0.001) = 120.03681604
```

FIG. 18F

Hash Map 1860

| Key 1862 | Value 1864 |
|---|---|
| $f'(5)$ | Derivative Link for f(x) |
| $f''(5+.00001)$ | Derivative Link for f(x) |
| $f'''(5+.0001)$ | Derivative Link for f(x) |
| $f''''(5+.001)$ | Derivative Link for f(x) |

FIG. 18G

| Features 1960 | Analytical 1910 | Example 1 1920 | Example 2 1930 | Example 3 1940 | Example 4 1950 |
|---|---|---|---|---|---|
| Accuracy Level | n/a | 1 | 1 | 1 | 4 |
| First Order Delta | n/a | .0000001 | .01 | .00001 | .01 |
| Second Order Delta | n/a | .0000001 | .01 | .0001 | .5 |
| Third Order Delta | n/a | .0000001 | .01 | .001 | .3 |
| @y/@x | 500 | 500.00001011 | 501.502001 | 500.00149998 | 500 |
| @@y/@@x | 300 | -2273.736754 | 301.2014 | 300.01203868 | 300 |
| @@@y/@@@x | 120 | 4547473508866 | 120.35999987 | 120.03681604 | 120 |

FIG. 19

| Method 2001 | First Order 2002 | Second Order 2003 | Third Order 2004 |
|---|---|---|---|
| $FD_1$ | 2 | 3 | 4 |
| $FD_2$ | 2 | 3 | 4 |
| $FD_3$ | 2 | 4 | 7 |
| $FD_{41}$ | 2 | 4 | 7 |
| $FD_{42}$ | 3 | 6 | 10 |
| $FD_{43}$ | 4 | 8 | 13 |
| $FD_{44}$ | 5 | 10 | 16 |
| $FD_{45}$ | 6 | 12 | 19 |
| $FD_{46}$ | 7 | 14 | 22 |

```
proc fcmp outlib=sasuser.funcs.PK;
    subroutine OneComp(t,y,dy,ke) ;
    outargs dy;
    dy = -ke*y;
    endsub;
run;

options cmplib=sasuser.funcs;

proc nlmixed data=sample1;
    parms beta1=0.5 beta2=1;
    elimRate = exp(beta1);
    DEQSOLVE y = OneComp(elimRate) subject=id / tStart=0 tEnd=time initVals=Dose;
    mu = y/beta2;
    model dv ~ normal(mu, 10);
run;
```

```
/* Accuracy Level 1 */
/* Target Result (Analytic solution): -5.06314E-8 */ function foo(x, a, b, SQRTTWOPI);
   y = 1/x/b/SQRTTWOPI*exp(-((log(x)-a)2/2/b2));;
   return(y);
endsub;

x = 20.12;
a = 0.567;
b =0.5;
SQRTTWOPI = sqrt(2 * constant('PI'));
SQRTTWO   = sqrt(2);

rc = __delta__.setaccuracy(1);
rc = __delta__.setdelta(1,.000001);
rc = __delta__.setdelta(2,.0001);
rx = __delta__.setdelta(3,.001);

y = foo(x, a, b, SQRTTWOPI);

der y/x/x/x;

run;
quit;
```

```
--- Program Execution Starting.
 1    (309:3)   x = 20.12
 1    (310:3)   a = 0.567
 1    (311:3)   b = 0.5
 1    (312:17)  SQRTTWOPI = 2.5066282746
 1    (313:20)  SQRTTWO = 1.4142135624
 1    (316:31)  rc = __DELTA__.SETACCURACY( 1 ) = 0
 1    (317:28)  rc = __DELTA__.SETDELTA( 1, 1E-6 ) = 0
 1    (318:28)  rc = __DELTA__.SETDELTA( 2, 0.0001 ) = 0
 1    (319:28)  rx = __DELTA__.SETDELTA( 3, 0.001 ) = 0
```

```
--- function foo Execution Starting.
1  (305:8)   ##dbl1 = 1 / (x=20.12) = 0.0497017893
1  (305:10)  ##dbl2 = (##dbl1=0.0497017893) / (b=0.5) = 0.0994035785
1  (305:12)  ##dbl3 = (##dbl2=0.0994035785) / (SQRTTWOPI=2.5066282746) = 0.0396562903
1  (305:33)  ##dbl4 = LOG( x=20.12) = 3.0017143452
1  (305:36)  ##dbl5 = (##dbl4=3.0017143452) - (a=0.567) = 2.4347143452
1  (305:39)  ##dbl6 = (##dbl5=2.4347143452) ** 2 = 5.9278339429
1  (305:42)  ##dbl7 = (##dbl6=5.9278339429) / 2 = 2.9639169714
1  (305:46)  ##dbl8 = (b=0.5) ** 2 = 0.25
1  (305:44)  ##dbl9 = (##dbl7=2.9639169714) / (##dbl8=0.25) = 11.855667886
1  (305:27)  ##dbl10 = - (##dbl9=11.855667886) = -11.855667886
1  (305:26)  ##dbl11 = EXP( ##dbl10=-11.855667886 ) = 7.0982102E-6
1  (305:22)  y = (##dbl3=0.0396562903) * (##dbl11=7.0982102E-6) = 2.8148869E-7
1  (306:10)   _foo__ = (y=2.8148869E-7) = 2.8148869E-7
--- function foo Execution Finished.
1  (321:12)  y = foo( x=20.12, a=0.567, b=0.5, SQRTTWOPI=2.5066282746 ) = 2.8148869E-7
1  (321:12)  @1dt1_1 = - (y=2.8148869E-7) = -2.8148869E-7
1  (321:12)  @1dt1_2 = (x=20.12) + (__DELTA__.delta1=1E-6) = 20.120001
```

FIG. 21C

```
--- function foo Execution Starting.
1  (305:8)   ##dbl1 = 1 / (x=20.120001) = 0.0497017868
1  (305:10)  ##dbl2 = (##dbl1=0.0497017868) / (b=0.5) = 0.0994035736
1  (305:12)  ##dbl3 = (##dbl2=0.0994035736) / (SQRTTWOPI=2.5066282746) = 0.0396562883
1  (305:33)  ##dbl4 = LOG( x=20.120001 ) = 3.0017143949
1  (305:36)  ##dbl5 = (##dbl4=3.0017143949) - (a=0.567) = 2.4347143949
1  (305:39)  ##dbl6 = (##dbl5=2.4347143949) ** 2 = 5.9278341849
1  (305:42)  ##dbl7 = (##dbl6=5.9278341849) / 2 = 2.9639170924
1  (305:46)  ##dbl8 = (b=0.5) ** 2 = 0.25
1  (305:44)  ##dbl9 = (##dbl7=2.9639170924) / (##dbl8=0.25) = 11.85566837
1  (305:27)  ##dbl10 = - (##dbl9=11.85566837) = -11.85566837
1  (305:26)  ##dbl11 = EXP( ##dbl10=-11.85566837 ) = 7.0982068E-6
1  (305:22)  y = (##dbl3=0.0396562883) * (##dbl11=7.0982068E-6) = 2.8148854E-7
1  (306:10)  _foo_ = (y=2.8148854E-7) = 2.8148854E-7
--- function foo Execution Finished.

1  (321:12)  @1dt1_3 = foo( @1dt1_2=20.120001, a=0.567, b=0.5, SQRTTWOPI=2.5066282746 ) = 2.8148854E-7
1  (321:12)  @1dt1_4 = (@1dt1_3=2.8148854E-7) - (y=2.8148869E-7) = -1.50242E-13
1  (321:12)  @y/@x = (@1dt1_4=-1.50242E-13) / (_DELTA__.delta1=1E-6) = -1.502418E-7
1  (321:12)  @2dt1_1 = - (@y/@x=-1.502418E-7) = 1.502418E-7
1  (321:12)  @2dt1_2 = 2 * (_DELTA__.delta2=0.0001) = 0.0002
1  (321:12)  @2dt1_3 = (x=20.12) + (_DELTA__.delta2=0.0001) = 20.1201
```

FIG. 21D

```
--- function foo Execution Starting.
1  (305:8)   ##dbl1 = 1 / (x=20.1201) = 0.0497015422
1  (305:10)  ##dbl2 = (##dbl1=0.0497015422) / (b=0.5) = 0.0994030845
1  (305:12)  ##dbl3 = (##dbl2=0.0994030845) / (SQRTTWOPI=2.5066282746) = 0.0396560932
1  (305:33)  ##dbl4 = LOG( x=20.1201 ) = 3.0017193154
1  (305:36)  ##dbl5 = (##dbl4=3.0017193154) - (a=0.567) = 2.4347193154
1  (305:39)  ##dbl6 = (##dbl5=2.4347193154) ** 2 = 5.9278581448
1  (305:42)  ##dbl7 = (##dbl6=5.9278581448) / 2 = 2.9639290724
1  (305:46)  ##dbl8 = (b=0.5) ** 2 = 0.25
1  (305:44)  ##dbl9 = (##dbl7=2.9639290724) / (##dbl8=0.25) = 11.85571629
1  (305:27)  ##dbl10 = - (##dbl9=11.85571629) = -11.85571629
1  (305:26)  ##dbl11 = EXP( ##dbl10=-11.85571629 ) = 7.0978667E-6
1  (305:22)  y = (##dbl3=0.0396560932) * (##dbl11=7.0978667E-6) = 2.8147366E-7
1  (306:10)  _foo_ = (y=2.8147366E-7) = 2.8147366E-7
--- function foo Execution Finished.
1  (321:12)  @2dt1_4 = foo( @2dt1_3=20.1201, a=0.567, b=0.5, SQRTTWOPI=2.5066282746 ) = 2.8147366E-7
1  (321:12)  @2dt1_5 = (@2dt1_4=2.8147366E-7)* -2 = -5.629473E-7
1  (321:12)  @2dt1_6 = (y=2.8148869E-7) + (@2dt1_5=-5.629473E-7) = -2.814586E-7
1  (321:12)  @2dt1_7 = (x=20.12) + (@2dt1_2=0.0002) = 20.1202
```

FIG. 21E

```
--- function foo Execution Starting.
1  (305:8)   ##dbl1 = 1 / (x=20.1202) = 0.0497012952
1  (305:10)  ##dbl2 = (##dbl1=0.0497012952) / (b=0.5) = 0.0994025904
1  (305:12)  ##dbl3 = (##dbl2=0.0994025904) / (SQRTTWOPI=2.5066282746) = 0.0396558961
1  (305:33)  ##dbl4 = LOG( x=20.1202 ) = 3.0017242855
1  (305:36)  ##dbl5 = (##dbl4=3.0017242855) - (a=0.567) = 2.4347242855
1  (305:39)  ##dbl6 = (##dbl5=2.4347242855) ** 2 = 5.9278823466
1  (305:42)  ##dbl7 = (##dbl6=5.9278823466) / 2 = 2.9639411733
1  (305:46)  ##dbl8 = (b=0.5) ** 2 = 0.25
1  (305:44)  ##dbl9 = (##dbl7=2.9639411733) / (##dbl8=0.25) = 11.855764693
1  (305:27)  ##dbl10 = - (##dbl9=11.855764693) = -11.855764693
1  (305:26)  ##dbl11 = EXP( ##dbl10=-11.855764693 ) = 7.0975231E-6
1  (305:22)  y = (##dbl3=0.0396558961) * (##dbl11=7.0975231E-6) = 2.8145864E-7
1  (306:10)  _foo__ (y=2.8145864E-7) = 2.8145864E-7
--- function foo Execution Finished.

1  (321:12)  @2dt1_8 = foo( @2dt1_7=20.1202, a=0.567, b=0.5, SQRTTWOPI=2.5066282746 ) = 2.8145864E-7
1  (321:12)  @2dt1_9 = (@2dt1_6=-2.814586E-7) + (@2dt1_8=2.8145864E-7) = 8.487063E-16
1  (321:12)  @2dt1_10 = (@2dt1_9=8.487063E-16) / (_DELTA__.delta2=0.0001) = 8.487063E-12
1  (321:12)  @@y/@x = (@2dt1_10=8.487063E-12) / (_DELTA__.delta2=0.0001) = 8.4870626E-8
1  (321:12)  @3dt1_1 = - (@@y/@x=8.4870626E-8) = -8.487063E-8
1  (321:12)  @3dt1_2 = 2 * (_DELTA__.delta3=0.001) = 0.002
1  (321:12)  @3dt1_3 = 3 * (_DELTA__.delta3=0.001) = 0.003
1  (321:12)  @3dt1_5 = (x=20.12) + (_DELTA__.delta3=0.001) = 20.121
```

FIG. 21F

```
--- function foo Execution Starting.
1  (305:8)   ##dbl1 = 1 / (x=20.121) = 0.0496993191
1  (305:10)  ##dbl2 = (##dbl1=0.0496993191) / (b=0.5) = 0.0993986382
1  (305:12)  ##dbl3 = (##dbl2=0.0993986382) / (SQRTTWOPI=2.5066282746) = 0.0396543194
1  (305:33)  ##dbl4 = LOG( x=20.121 ) = 3.0017640458
1  (305:36)  ##dbl5 = (##dbl4=3.0017640458) - (a=0.567) = 2.4347640458
1  (305:39)  ##dbl6 = (##dbl5=2.4347640458) ** 2 = 5.9280759587
1  (305:42)  ##dbl7 = (##dbl6=5.9280759587) / 2 = 2.9640379793
1  (305:46)  ##dbl8 = (b=0.5) ** 2 = 0.25
1  (305:44)  ##dbl9 = (##dbl7=2.9640379793) / (##dbl8=0.25) = 11.856151917
1  (305:27)  ##dbl10 = - (##dbl9=11.856151917) = -11.85615192
1  (305:26)  ##dbl11 = EXP( ##dbl10=-11.85615192 ) = 7.0947753E-6
1  (305:22)  y = (##dbl3=0.0396543194) * (##dbl11=7.0947753E-6) = 2.8133849E-7
1  (306:10)  _foo__ = (y=2.8133849E-7) = 2.8133849E-7
--- function foo Execution Finished.
1  (321:12)  @3dt1_6 = foo(@3dt1_5=20.121, a=0.567, b=0.5, SQRTTWOPI=2.5066282746 ) = 2.8133849E-7
1  (321:12)  @3dt1_7 = (@3dt1_6=2.8133849E-7) * 3 = 8.4401546E-7
1  (321:12)  @3dt1_8 = (@3dt1_7=8.4401546E-7) - (y=2.8148869E-7) = 5.6252677E-7
1  (321:12)  @3dt1_9 = (x=20.12) + (@3dt1_2=0.002) = 20.122
```

FIG. 21G

```
--- function foo Execution Starting.
1   (305:8)   ##dbl1 = 1 / (x=20.122) = 0.0496968492
1   (305:10)  ##dbl2 = (##dbl1=0.0496968492) / (b=0.5) = 0.0993936984
1   (305:12)  ##dbl3 = (##dbl2=0.0993936984) / (SQRTTWOPI=2.5066282746) = 0.0396523487
1   (305:33)  ##dbl4 = LOG( x=20.122 ) = 3.0018137439
1   (305:36)  ##dbl5 = (##dbl4=3.0018137439) - (a=0.567) = 2.4348137439
1   (305:39)  ##dbl6 = (##dbl5=2.4348137439) ** 2 = 5.9283179673
1   (305:42)  ##dbl7 = (##dbl6=5.9283179673) / 2 = 2.9641589837
1   (305:46)  ##dbl8 = (b=0.5) ** 2 = 0.25
1   (305:44)  ##dbl9 = (##dbl7=2.9641589837) / (##dbl8=0.25) = 11.856635935
1   (305:27)  ##dbl10 = - (##dbl9=11.856635935) = -11.85663593
1   (305:26)  ##dbl11 = EXP( ##dbl10=-11.85663593 ) = 7.0913421E-6
1   (305:22)  y = (##dbl3=0.0396523487) * (##dbl11=7.0913421E-6) = 2.8118837E-7
1   (306:10)  _foo__ = (y=2.8118837E-7) = 2.8118837E-7
--- function foo Execution Finished.
1   (321:12)  @3dt1_10 = foo( @3dt1_9=20.122, a=0.567, b=0.5, SQRTTWOPI=2.5066282746 ) = 2.8118837E-7
1   (321:12)  @3dt1_11 = (@3dt1_10=2.8118837E-7) * -3 = -8.435651E-7
1   (321:12)  @3dt1_12 = (@3dt1_8=5.6252677E-7) + (@3dt1_11=-8.435651E-7) = -2.810383E-7
1   (321:12)  @3dt1_13 = (x=20.12) + (@3dt1_3=0.003) = 20.123
```

FIG. 21H

```
--- function foo Execution Starting.
1  (305:8)   ##dbl1 = 1 / (x=20.123) = 0.0496943796
1  (305:10)  ##dbl2 = (##dbl1=0.0496943796) / (b=0.5) = 0.0993887591
1  (305:12)  ##dbl3 = (##dbl2=0.0993887591) / (SQRTTWOPI=2.5066282746) = 0.0396503782
1  (305:33)  ##dbl4 = LOG( x=20.123 ) = 3.0018634395
1  (305:36)  ##dbl5 = (##dbl4=3.0018634395) - (a=0.567) = 2.4348634395
1  (305:39)  ##dbl6 = (##dbl5=2.4348634395) ** 2 = 5.9285599689
1  (305:42)  ##dbl7 = (##dbl6=5.9285599689) / 2 = 2.9642799845
1  (305:46)  ##dbl8 = (b=0.5) ** 2 = 0.25
1  (305:44)  ##dbl9 = (##dbl7=2.9642799845) / (##dbl8=0.25) = 11.857119938
1  (305:27)  ##dbl10 = - (##dbl9=11.857119938) = -11.857119938
1  (305:26)  ##dbl11 = EXP( ##dbl10=-11.857119938 ) = 7.0879107E-6
1  (305:22)  y = (##dbl3=0.0396503782) * (##dbl11=7.0879107E-6) = 2.8103834E-7
1  (306:10)  _foo__ = (y=2.8103834E-7) = 2.8103834E-7
--- function foo Execution Finished.
1  (321:12)  @3dt1_14 = foo( @3dt1_13=20.123, a=0.567, b=0.5, SQRTTWOPI=2.5066282746 ) = 2.8103834E-7
1  (321:12)  @3dt1_15 = (@3dt1_12=-2.8103834E-7) + (@3dt1_14=2.8103834E-7) = -5.05794E-17
1  (321:12)  @3dt1_16 = (@3dt1_15=-5.05794E-17) / (_DELTA__.delta3=0.001) = -5.05794E-14
1  (321:12)  @3dt1_17 = (@3dt1_16=-5.05794E-14) / (_DELTA__.delta3=0.001) = -5.05794E-11
1  (321:12)  @@@y/@x/@x = (@3dt1_17=-5.05794E-11) / (_DELTA__.delta3=0.001) = -5.057935E-8
```

FIG. 21I

```
/* Accuracy Level 3 */
/* Target Result (Analytic solution): -5.06314E-8 */ function foo(x, a, b, SQRTTWOPI);
   y = 1/x/b/SQRTTWOPI*exp(-((log(x)-a)2/2/b2));;
   return(y);
endsub;

x = 20.12;
a = 0.567;
b = 0.5;
SQRTTWOPI = sqrt(2 * constant('PI'));
SQRTTWO   = sqrt(2);

rc = __delta__.setaccuracy(3);
rc = __delta__.setdelta(1,.000001);
rc = __delta__.setdelta(2,.001);
rx = __delta__.setdelta(3,.01);

y = foo(x, a, b, SQRTTWOPI);

der y/x/x/x;

run;
quit;
```

FIG. 22A

```
--- Program Execution Starting.
 1   (92:3)   x = 20.12
 1   (93:3)   a = 0.567
 1   (94:3)   b = 0.5
 1   (95:17)  SQRTTWOPI = 2.5066282746
 1   (96:20)  SQRTTWO = 1.4142135624
 1   (99:31)  rc = __DELTA__.SETACCURACY( 3 ) = 0
 1   (100:28) rc = __DELTA__.SETDELTA( 1, 1E-6 ) = 0
 1   (101:28) rc = __DELTA__.SETDELTA( 2, 0.001 ) = 0
 1   (102:28) rx = __DELTA__.SETDELTA( 3, 0.01 ) = 0
```

FIG. 22B

```
--- function foo Execution Starting.
1  (88:8)   ##dbl1 = 1 / (x=20.15) = 0.0496277916
1  (88:10)  ##dbl2 = (##dbl1=0.0496277916) / (b=0.5) = 0.0992555831
1  (88:12)  ##dbl3 = (##dbl2=0.0992555831) / (SQRTTWOPI=2.5066282746) = 0.0395972487
1  (88:33)  ##dbl4 = LOG( x=20.15 ) = 3.0032042884
1  (88:36)  ##dbl5 = (##dbl4=3.0032042884) - (a=0.567) = 2.4362042884
1  (88:39)  ##dbl6 = (##dbl5=2.4362042884) ** 2 = 5.9350913348
1  (88:42)  ##dbl7 = (##dbl6=5.9350913348) / 2 = 2.9675456674
1  (88:46)  ##dbl8 = (b=0.5) ** 2 = 0.25
1  (88:44)  ##dbl9 = (##dbl7=2.9675456674) / (##dbl8=0.25) = 11.87018267
1  (88:27)  ##dbl10 = - (##dbl9=11.87018267) = -11.87018267
1  (88:26)  ##dbl11 = EXP( ##dbl10=-11.87018267 ) = 6.9959254E-6
1  (88:22)  y = (##dbl3=0.0395972487) * (##dbl11=6.9959254E-6) = 2.770194E-7
1  (89:10)  __foo__ = (y=2.770194E-7) = 2.770194E-7
--- function foo Execution Finished.
1  (104:12)  @3dt1_17 = foo( @3dt1_16=20.15, a=0.567, b=0.5, SQRTTWOPI=2.5066282746 ) = 2.770194E-7
1  (104:12)  @3dt1_18 = (@3dt1_17=2.770194E-7) * 24.5 = 6.7869752E-6
1  (104:12)  @3dt1_19 = (@3dt1_15=-4.442268E-6) + (@3dt1_18=6.7869752E-6) = 2.3447074E-6
1  (104:12)  @3dt1_20 = (x=20.12) + (@3dt1_5=0.04) = 20.16
```

FIG. 22C

```
--- function foo Execution Starting.
1  (88:8)   ##dbl1  = 1 / (x=20.16) = 0.0496031746
1  (88:10)  ##dbl2  = (##dbl1=0.0496031746) / (b=0.5) = 0.0992063492
1  (88:12)  ##dbl3  = (##dbl2=0.0992063492) / (SQRTTWOPI=2.5066282746) = 0.0395776072
1  (88:33)  ##dbl4  = LOG( x=20.16 ) = 3.0037004432
1  (88:36)  ##dbl5  = (##dbl4=3.0037004432) - (a=0.567) = 2.4367004432
1  (88:39)  ##dbl6  = (##dbl5=2.4367004432) ** 2 = 5.9375090499
1  (88:42)  ##dbl7  = (##dbl6=5.9375090499) / 2 = 2.968754525
1  (88:46)  ##dbl8  = (b=0.5) ** 2 = 0.25
1  (88:44)  ##dbl9  = (##dbl7=2.968754525) / (##dbl8=0.25) = 11.8750181
1  (88:27)  ##dbl10 = - (##dbl9=11.8750181) = -11.8750181
1  (88:26)  ##dbl11 = EXP( ##dbl10=-11.8750181 ) = 6.9621787E-6
1  (88:22)  y = (##dbl3=0.0395776072) * (##dbl11=6.9621787E-6) = 2.7554637E-7
1  (89:10)  _foo_ = (y=2.7554637E-7) = 2.7554637E-7
--- function foo Execution Finished.
1  (104:12) @3dt1_21 = foo( @3dt1_20=20.16, a=0.567, b=0.5, SQRTTWOPI=2.5066282746 ) = 2.7554637E-7
1  (104:12) @3dt1_22 = (@3dt1_21=2.7554637E-7) * -10.25 = -2.82435E-6
1  (104:12) @3dt1_23 = (@3dt1_19=2.3447074E-6) + (@3dt1_22=-2.82435E-6) = -4.796429E-7
1  (104:12) @3dt1_24 = (x=20.12) + (@3dt1_6=0.05) = 20.17
```

FIG. 22D

```
--- function foo Execution Starting.
1   (88:8)    ##dbl1 = 1 / (x=20.17) = 0.0495785821
1   (88:10)   ##dbl2 = (##dbl1=0.0495785821) / (b=0.5) = 0.0991571641
1   (88:12)   ##dbl3 = (##dbl2=0.0991571641) / (SQRTTWOPI=2.5066282746) = 0.0395579852
1   (88:33)   ##dbl4 = LOG( x=20.17 ) = 3.004196352
1   (88:36)   ##dbl5 = (##dbl4=3.004196352) - (a=0.567) = 2.437196352
1   (88:39)   ##dbl6 = (##dbl5=2.437196352) ** 2 = 5.939926058
1   (88:42)   ##dbl7 = (##dbl6=5.939926058) / 2 = 2.969963029
1   (88:46)   ##dbl8 = (b=0.5) ** 2 = 0.25
1   (88:44)   ##dbl9 = (##dbl7=2.969963029) / (##dbl8=0.25) = 11.879852116
1   (88:27)   ##dbl10 = - (##dbl9=11.879852116) = -11.879852116
1   (88:26)   ##dbl11 = EXP( ##dbl10=-11.879852116 ) = 6.9286046E-6
1   (88:22)   y = (##dbl3=0.0395579852) * (##dbl11=6.9286046E-6) = 2.7408164E-7
1   (89:10)   _foo__ = (y=2.7408164E-7) = 2.7408164E-7
--- function foo Execution Finished.

1   (104:12)  @3dt1_25 = foo( @3dt1_24=20.17, a=0.567, b=0.5, SQRTTWOPI=2.5066282746 ) = 2.7408164E-7
1   (104:12)  @3dt1_26 = (@3dt1_25=2.7408164E-7) * 1.75 = 4.7964287E-7
1   (104:12)  @3dt1_27 = (@3dt1_26=4.7964287E-7) + (@3dt1_26=4.7964287E-7) = -5.06314E-8
1   (104:12)  @3dt1_28 = (@3dt1_27=-5.06314E-14) / (__DELTA__.delta3=0.01) = -5.06314E-12
1   (104:12)  @3dt1_29 = (@3dt1_28=-5.06314E-12) / (__DELTA__.delta3=0.01) = -5.06314E-10
1   (104:12)  @@@y/@x/@x = (@3dt1_29=-5.06314E-10) / (__DELTA__.delta3=0.01) = -5.06314E-8
```

FIG. 22E

```
/* Variable Accuracy Level */
/* Target Result (Analytic solution):-5.06314E-8 */ function foo(x, a, b, SQRTTWOPI);
  y = 1/x/b/SQRTTWOPI*exp(-((log(x)-a)2/2/b2));;
  return(y);
endsub;

x = 20.12;
a = 0.567;
b =0.5;
SQRTTWOPI = sqrt(2 * constant('PI'));
SQRTTWO   = sqrt(2);

rc =  __delta__.setaccuracy(1);
rc =  __delta__.setdelta(1.000001, 1);
rc =  __delta__.setdelta(2,.0001, 3);
rx =  __delta__.setdelta(3,.001, 2);

y = foo(x, a, b, SQRTTWOPI);

der y/x/x/x;

run;
quit;
```

FIG. 23

COMPUTING SYSTEMS AND DEVICES FOR HASHMAP CONTROL OF COMPUTING OPERATIONS

CROSS-REFERENCE TO RELATED APPLICATIONS

This application claims the benefit of, and priority based on, 35 U.S.C. § 119 to U.S. Provisional Application No. 63/758,799, filed Feb. 14, 2025, and claims priority to U.S. Provisional Application No. 63/766,181, filed Mar. 3, 2025, the disclosures of each of which are incorporated herein by reference in their entirety.

BACKGROUND

A compiler is a computing system that operates a computer program that translates code written in a source language to a target language. Source code is usually written in a high-level language, and the target code is usually written in a machine code executable by a computing system. One use of a compiler is for generating computer instructions for executing computer modeling techniques.

SUMMARY

In an example embodiment, a computer-program product tangibly embodied in a non-transitory machine-readable storage medium is provided. The computer-program product includes instructions to cause a computing system to receive an input set for a function to effectuate a response to the input set. The input set comprises one or more inputs. The computer-program product includes instructions to cause a computing system to receive a request to generate computing operations to effectuate the response for the function to the input set. The computer-program product includes instructions to cause a computing system to, responsive to the request to generate the computing operations, generate a hashmap data structure. The hashmap data structure indexes respective data storage associated with a respective key of one or more keys. The computer-program product includes instructions to cause a computing system to generate a first set of computing instructions to solve a first component for the function, execute the first set of computing instructions, and generate a first hash key of the one or more of the keys. The first hash key represents multiple executions of the first set of computing instructions. The computer-program product includes instructions to store the first hash key in the hashmap data structure to index a storage location in the hashmap data structure; generate a second set of computing instructions to solve a second component for the function; execute the second set of computing instructions by using the first hash key to retrieve data indexed by the first hash key. The computer-program product includes instructions to determine that an operation is a final execution of a last set of computing instructions for the function. The computer-program product includes instructions to send, based on an output from the final execution, the response for the function to the input set.

In another example embodiment, a computing device is provided. The computing device includes, but is not limited to, a processor and memory. The memory contains instructions that when executed by the processor control the computing device to receive an input set for a function to effectuate a response to the input set. The input set comprises one or more inputs. The memory contains instructions that when executed by the processor control the computing device to receive a request to generate computing operations to effectuate the response for the function to the input set. The memory contains instructions that when executed by the processor control the computing device to, responsive to the request to generate the computing operations: generate a hashmap data structure. The hashmap data structure indexes respective data storage associated with a respective key of one or more keys. The memory contains instructions that when executed by the processor control the computing device to generate a first set of computing instructions to solve a first component for the function, execute the first set of computing instructions, and generate a first hash key of the one or more of the keys. The first hash key represents multiple executions of the first set of computing instructions. The memory contains instructions that when executed by the processor control the computing device store the first hash key in the hashmap data structure to index a storage location in the hashmap data structure, generate a second set of computing instructions to solve a second component for the function, and execute the second set of computing instructions by using the first hash key to retrieve data indexed by the first hash key. The memory contains instructions that when executed by the processor control the computing device to determine that an operation is a final execution of a last set of computing instructions for the function. The memory contains instructions that when executed by the processor control the computing device to send, based on an output from the final execution, the response for the function to the input set.

In another example embodiment, a method of generating a hashmap data structure is provided including a method of receiving an input set for a function to effectuate a response to the input set, receiving a request to generate computing operations to effectuate the response for the function to the input set, performing operations responsive to the request to generate the computing operations, and sending the response for the function to the input set is provided.

Other features and aspects of example embodiments are presented below in the Detailed Description when read in connection with the drawings presented with this application.

BRIEF DESCRIPTION OF THE DRAWINGS

FIGS. 16A-16E illustrate a hashmap construction according to at least one embodiment of the present technology.

FIGS. 17A-17B illustrate use of a hashmap for a finite difference method according to at least one embodiment of the present technology.

FIGS. 18A-18G illustrate computing operations according to at least one embodiment of the present technology.

FIG. 19 illustrates improvements to accuracy in computing operations according to at least one embodiment of the present technology.

FIGS. 20A-20B illustrate complexity in computing operations according to at least one embodiment of the present technology.

FIGS. 21A-21I illustrate computing operations for a multivariate function with accuracy of 1 according to at least one embodiment of the present technology.

FIGS. 22A-22E illustrate computing operations for a multivariate function with accuracy of 3 according to at least one embodiment of the present technology.

FIG. 23 illustrates a multivariate function with component level accuracy levels according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
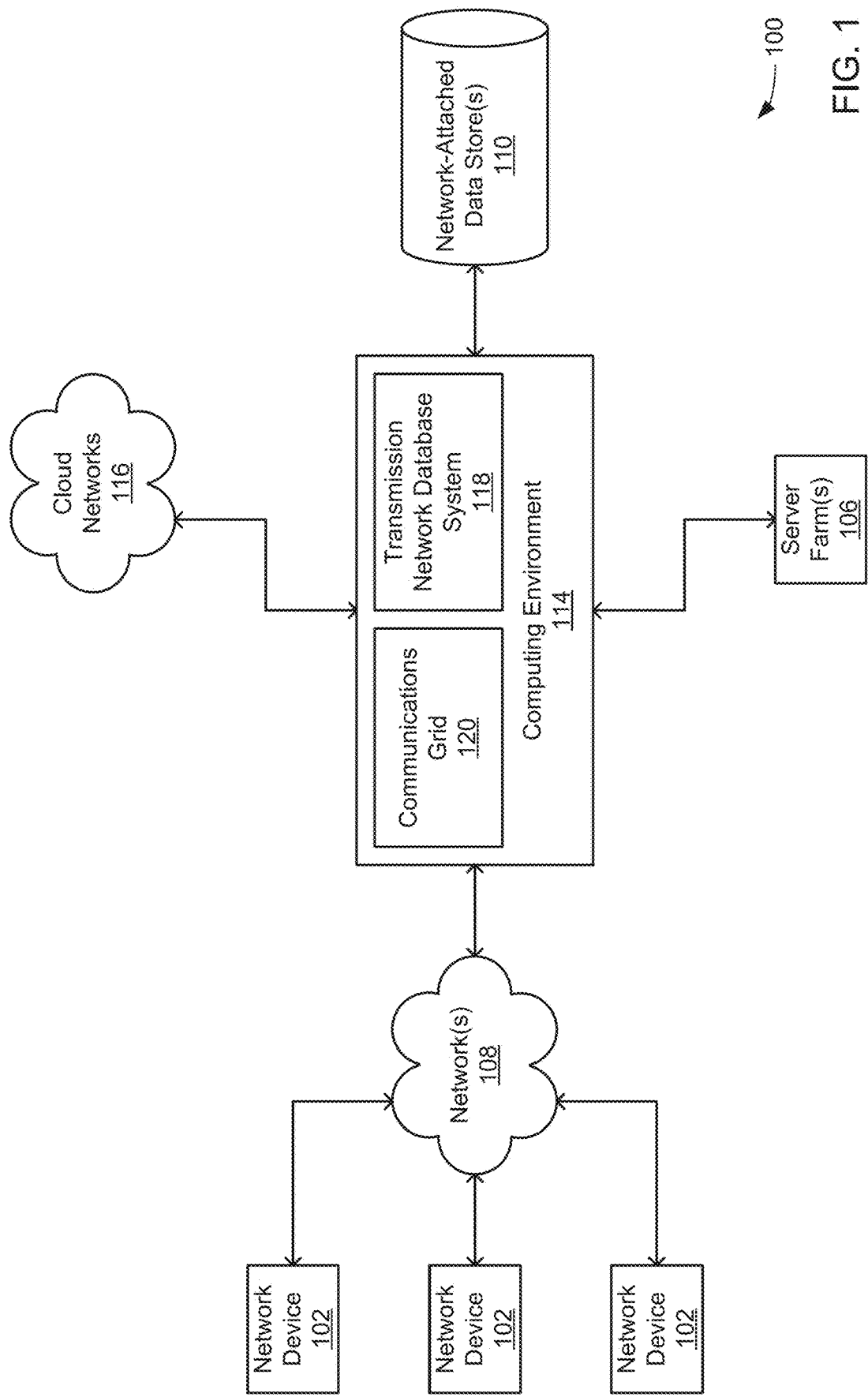
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
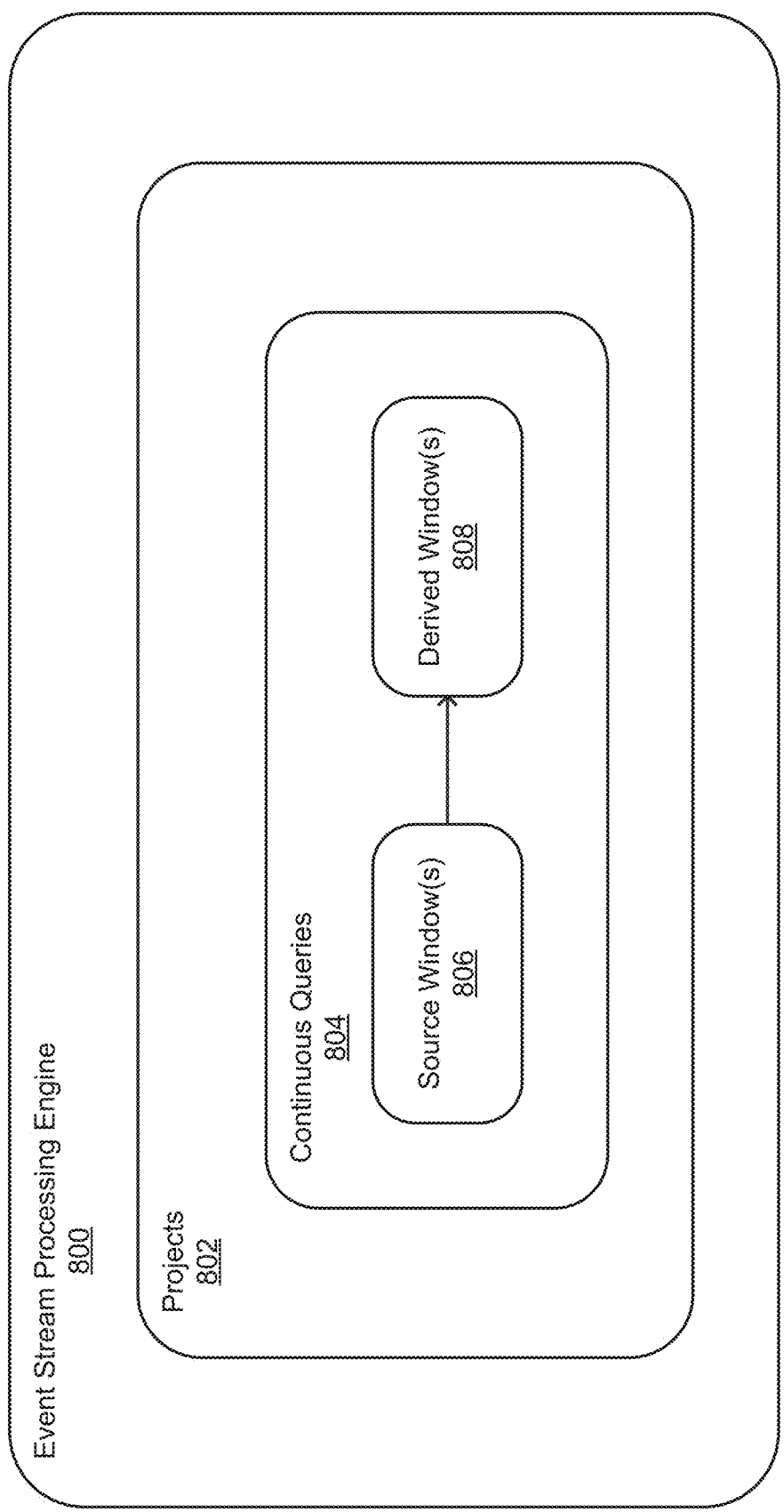
FIG. 8 illustrates a block diagram including components of an Event Stream Processing Engine (ESPE), according to embodiments of the present technology.
Figure 9:
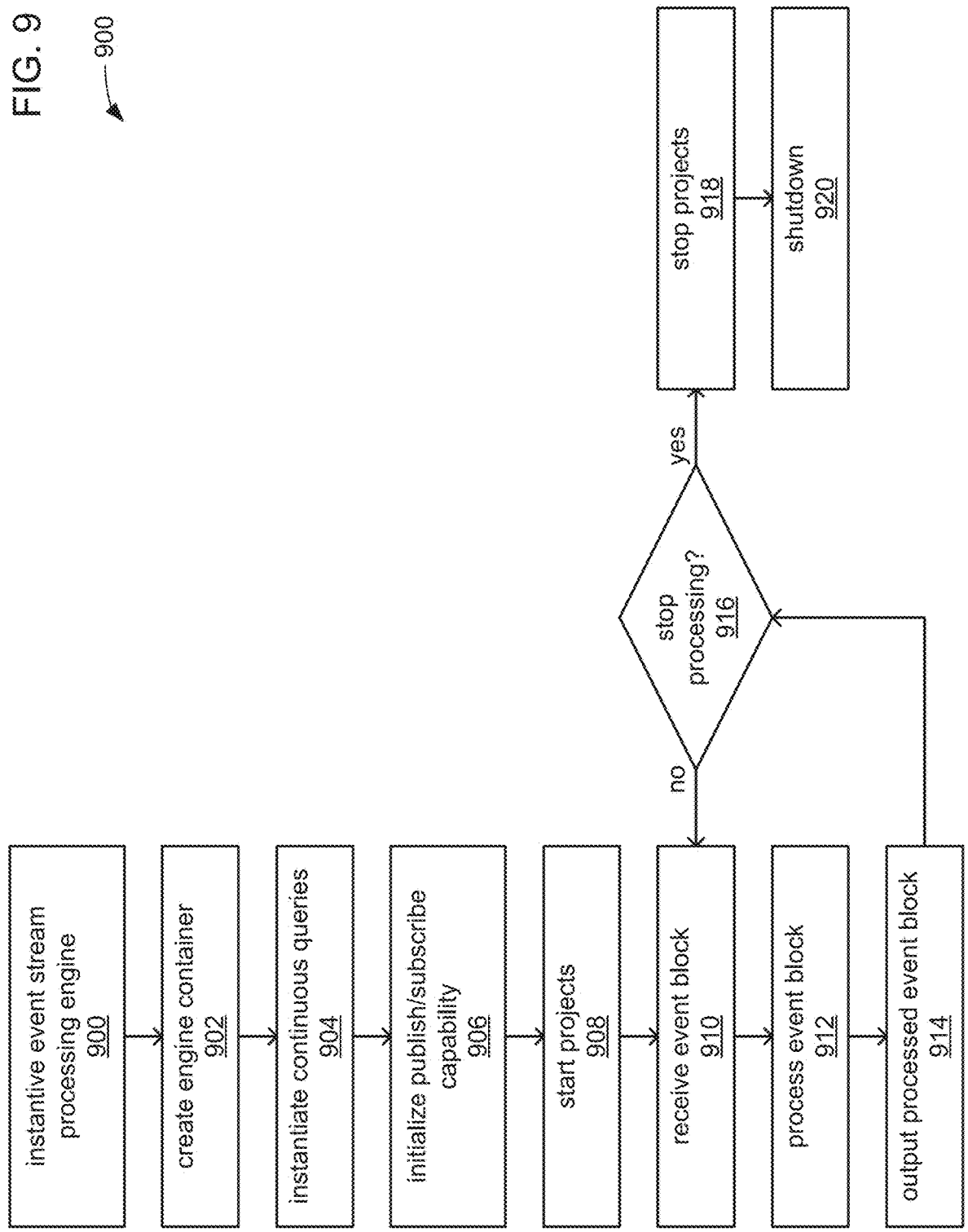
FIG. 9 illustrates a flow chart showing an example process including operations performed by an event stream processing engine, according to some embodiments of the present technology.
Figure 10:
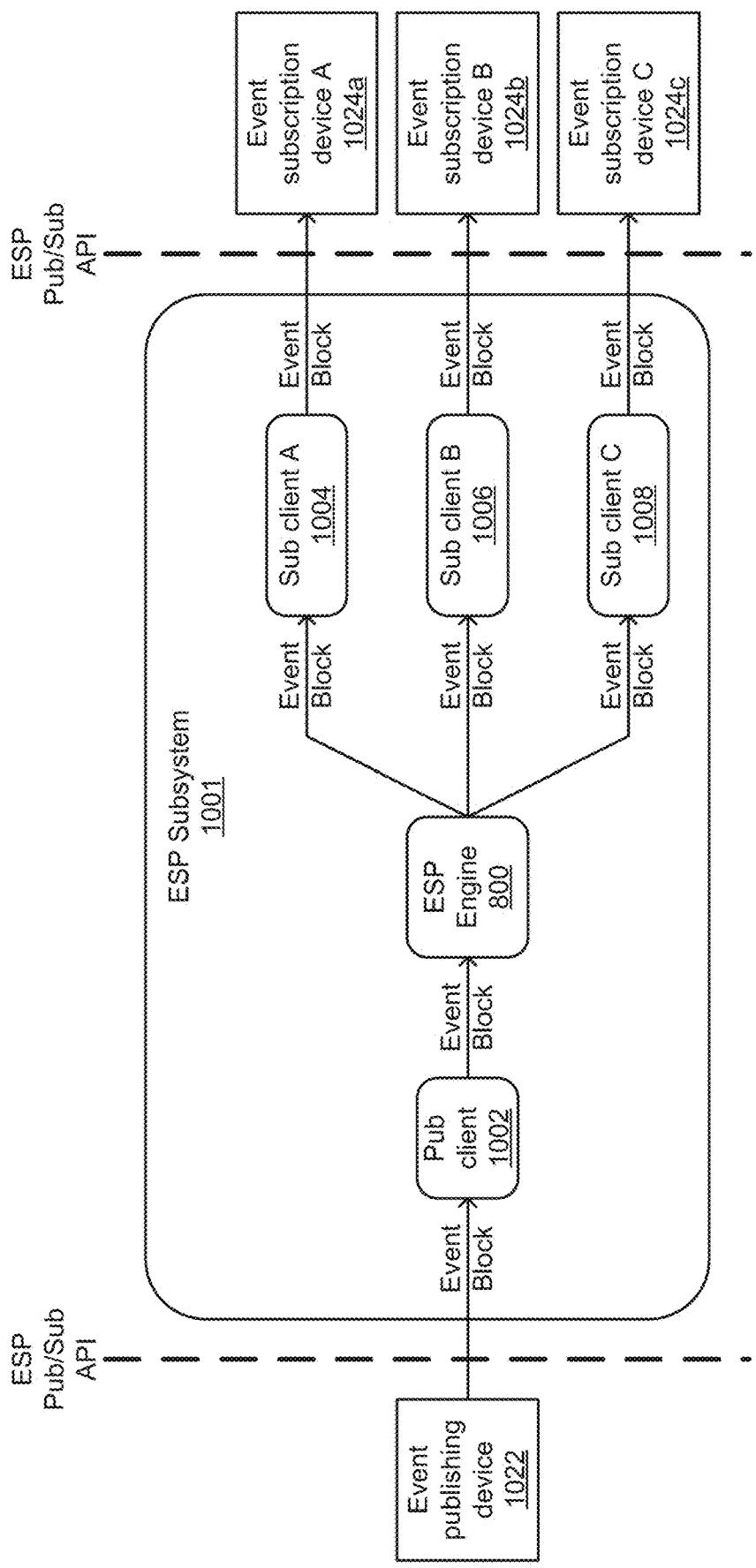
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP or MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
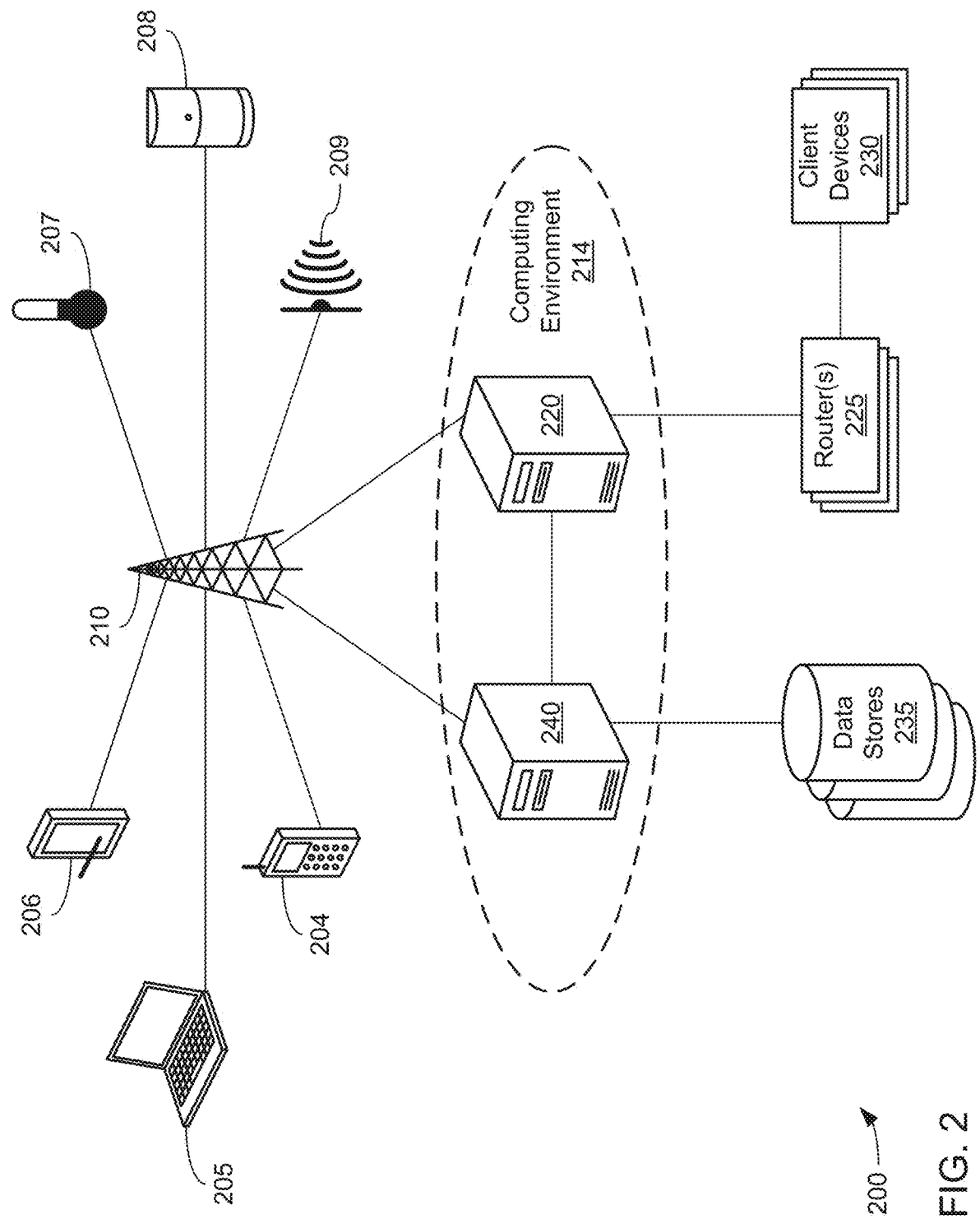
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
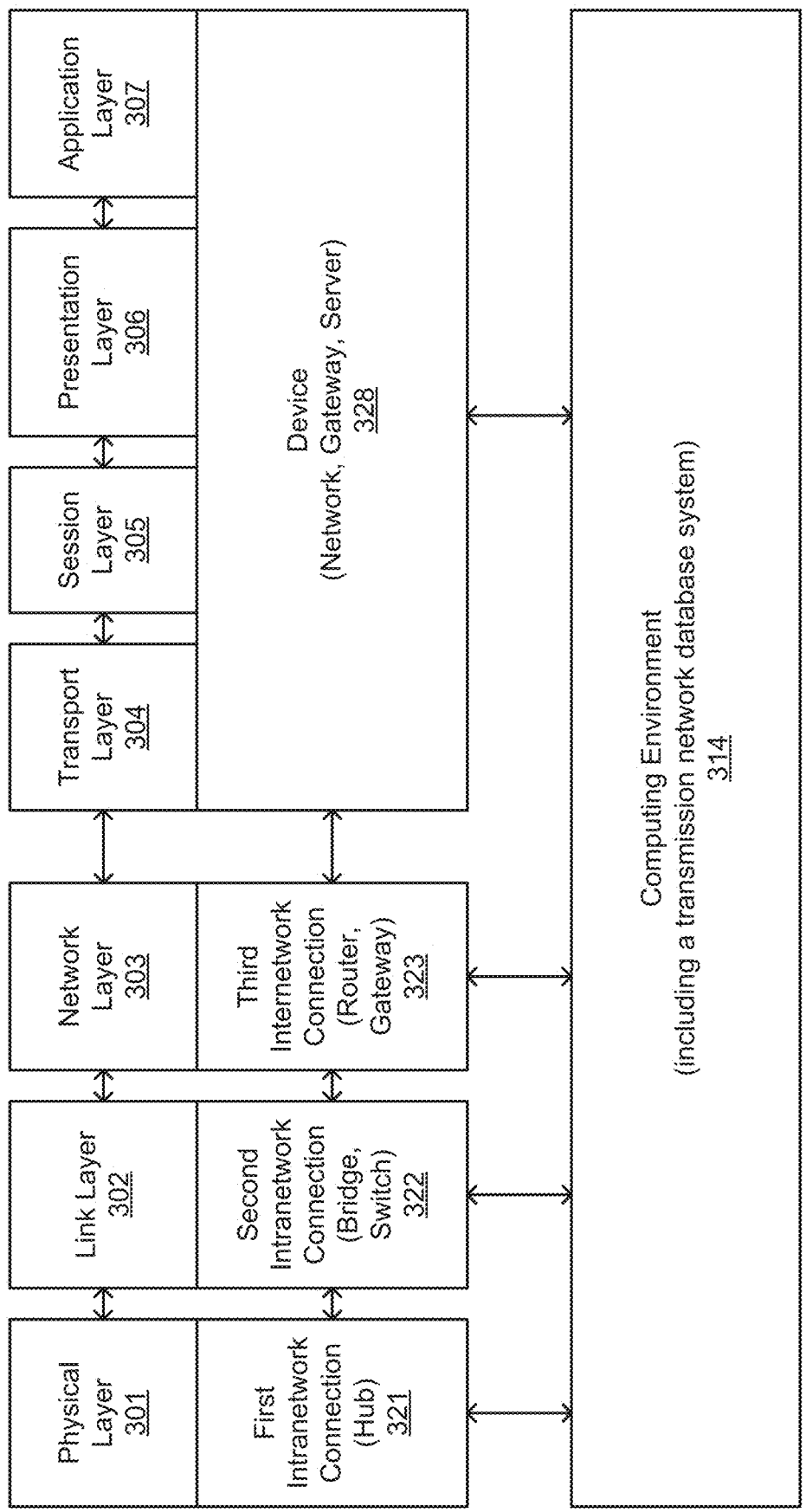
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data, and the physical layer is the farthest layer from the user in a communications system. On the other hand, the application layer is the highest layer because it interacts directly with a software application.

As noted, the model includes a physical layer 301. Physical layer 301 represents physical communication and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
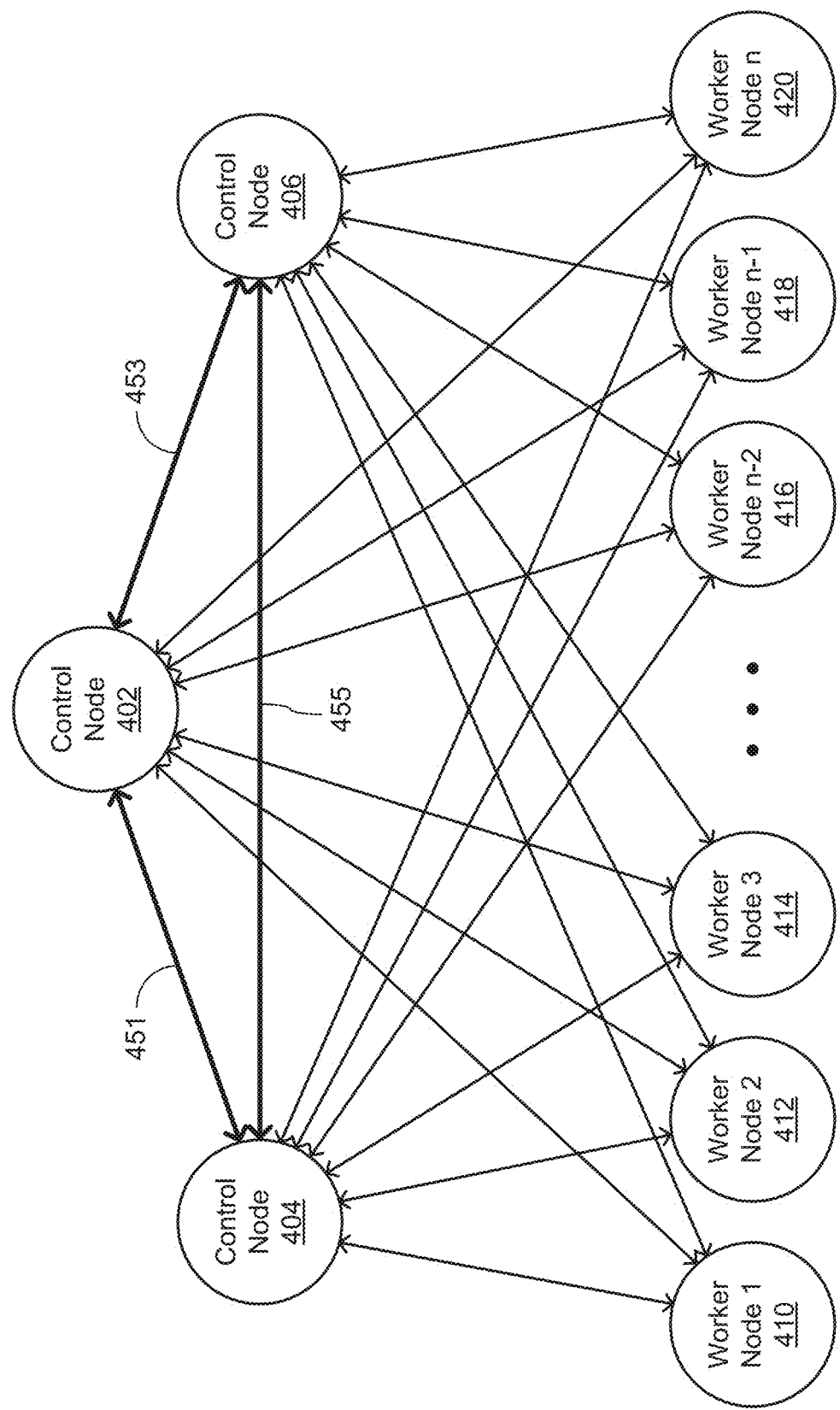
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail, and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
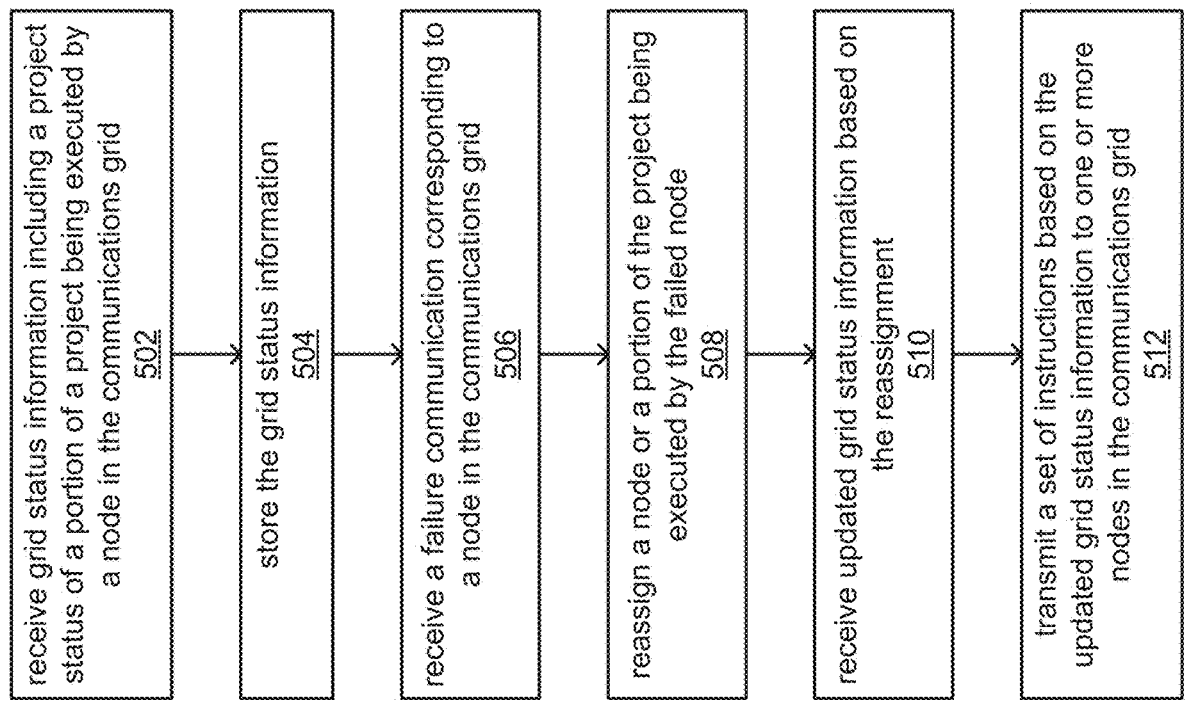
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
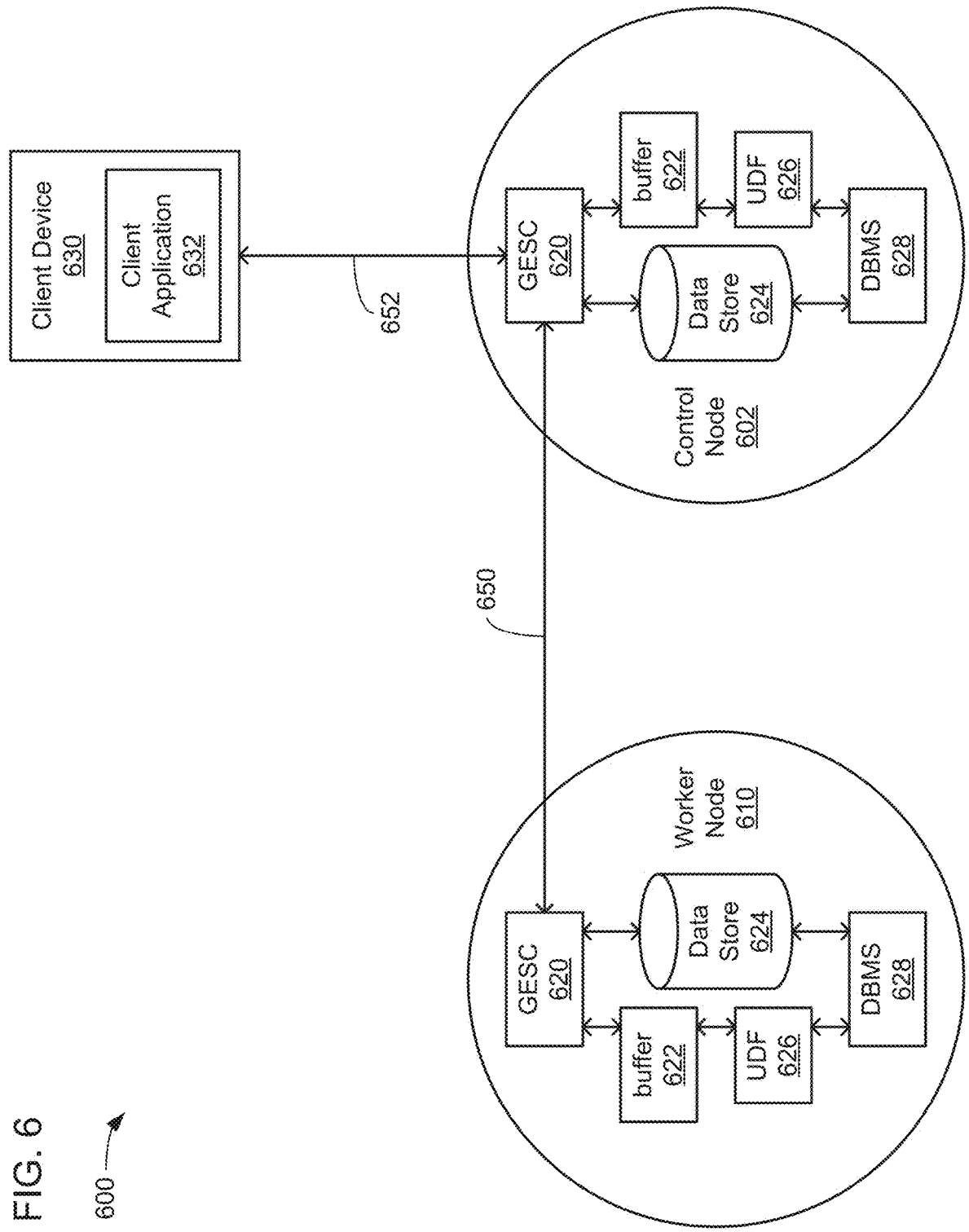
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
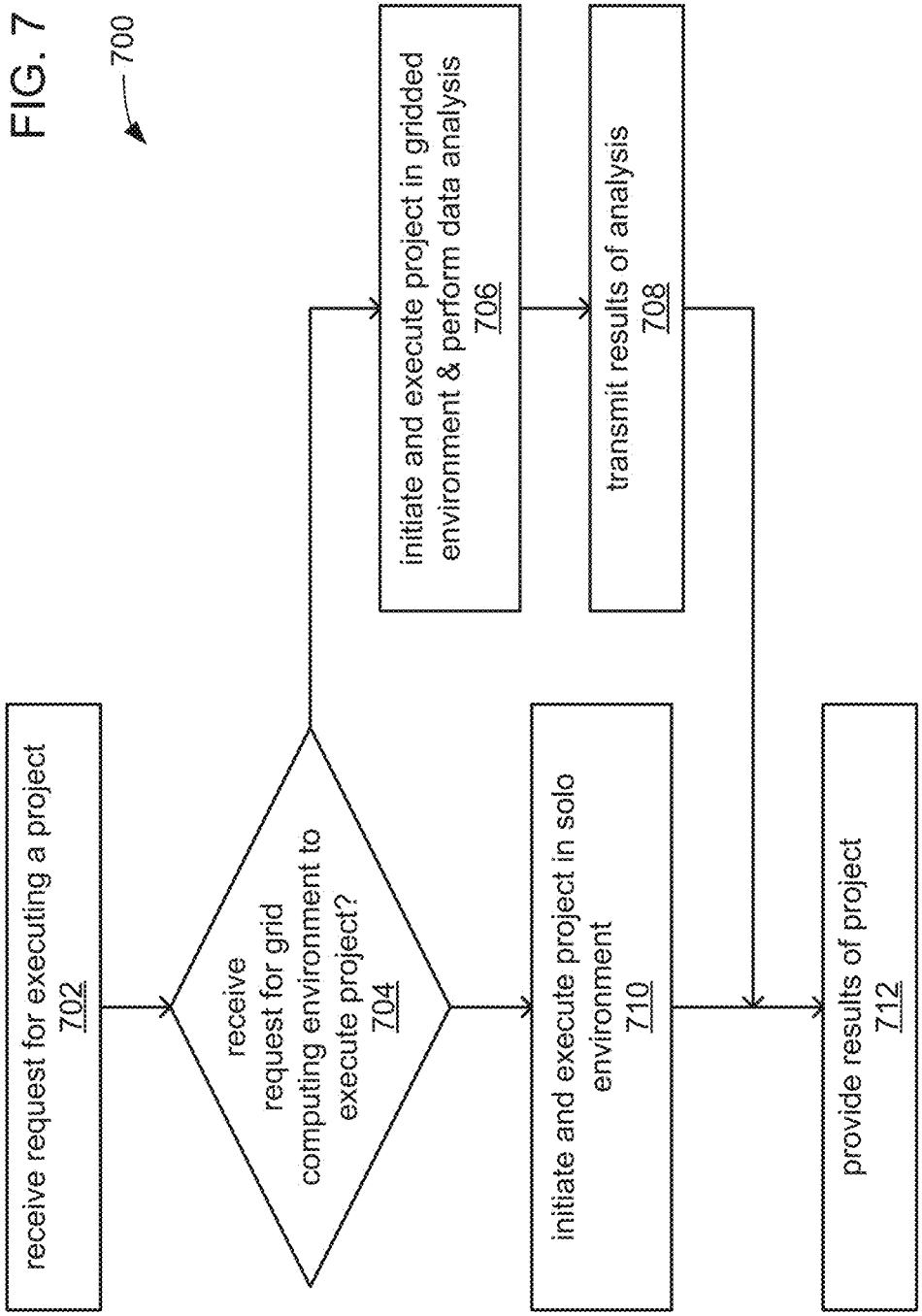
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
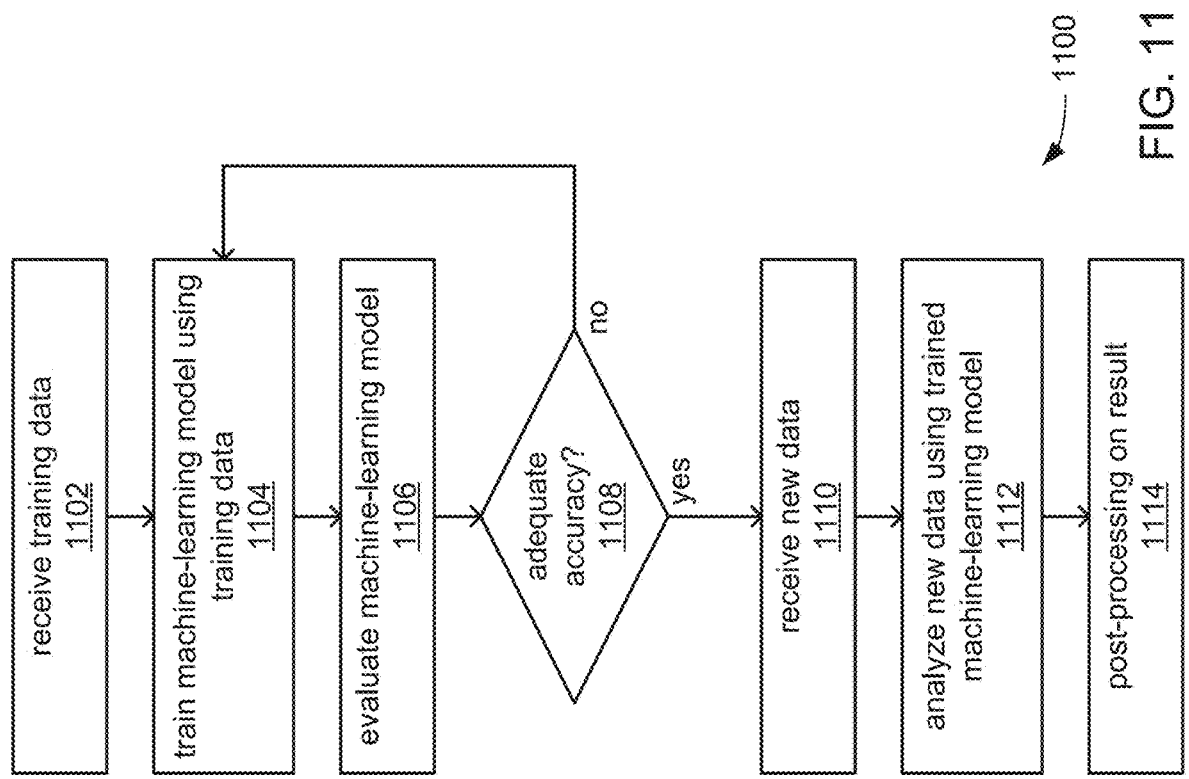
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, transformer networks, large language models (LLMs), agents of LLMs, multi-modal models, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
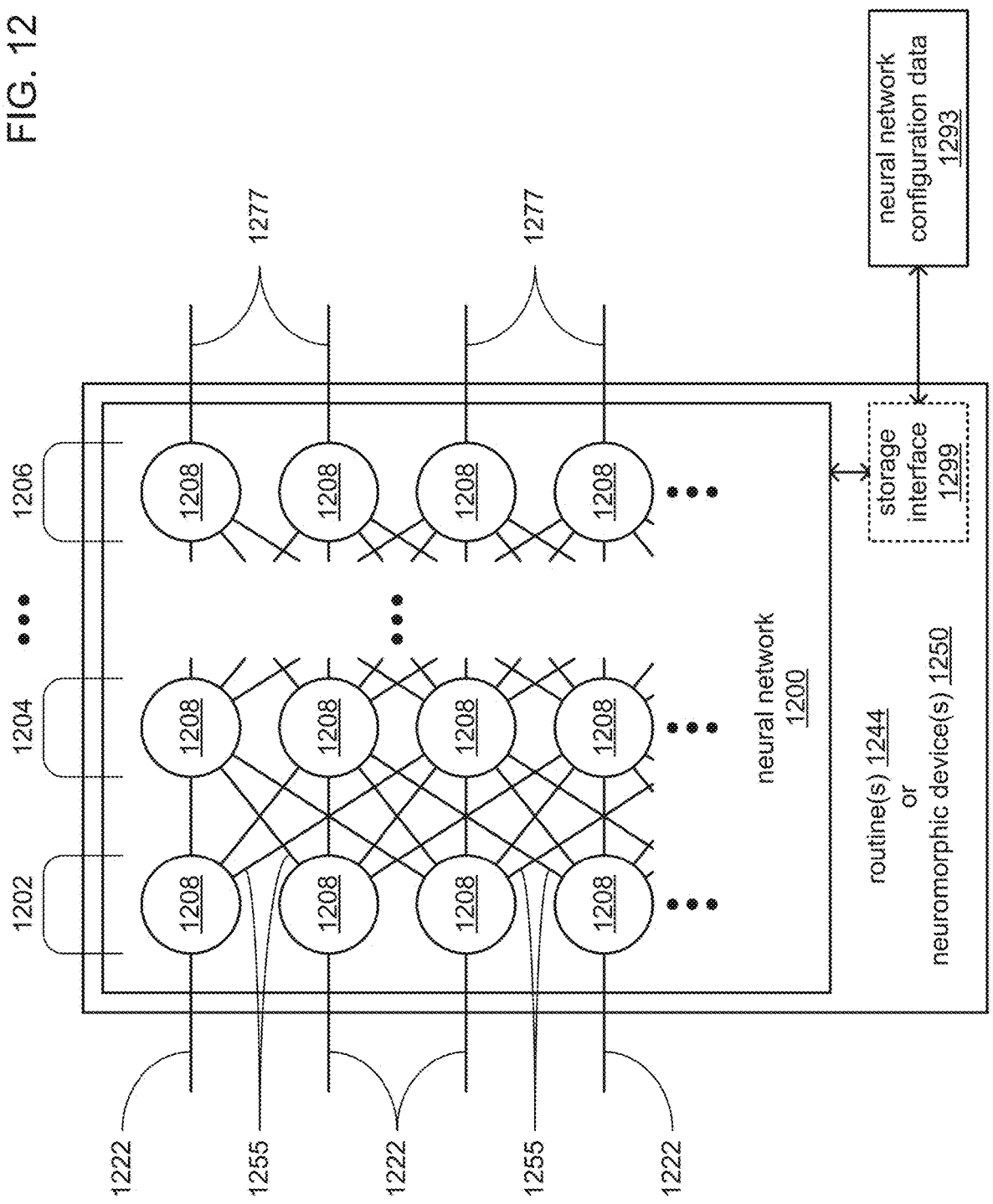
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
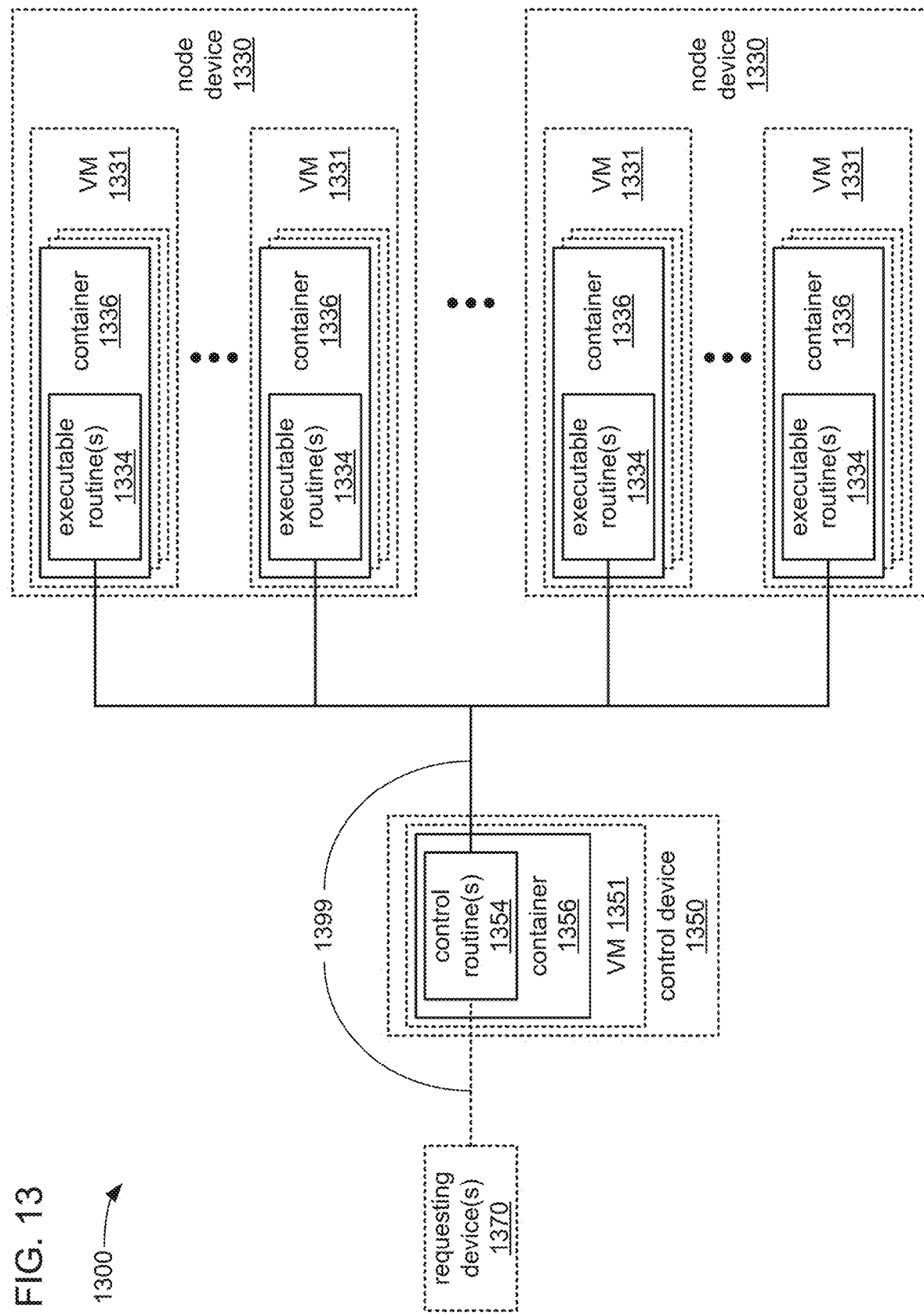
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Computing devices and systems sometimes generate for a requested function target computing instructions for recursive operations depending on the function type. For instance, a compiler generating code for determining a response to a function sometimes needs to generate derivative operations (e.g., in model prediction). Recursive computing operations can be useful for solving components related to different derivative orders. With recursive operations, typically results from a set of instructions are fed back into the same set of instructions. Recursive operations can lead to erroneous results when rounded output is used. Embodiments improve computer processing by excluding operations in a recursive process and using a unique hashmap data structure. This can be useful for many industries using recursive computer processes or derivative operations. For instance, some model prediction and machine learning approaches use responses for functions with derivative orders and/or recursive computer processes.

Embodiments are applicable to different industries because many industries use modeling techniques to generate models derived based on differential equations. As an example in the medical field, pharmacokinetic pharmacodynamic (PKPD) modeling is used to determine the time course of effect intensity in response to administration of a drug dose, and quantitative systems pharmacology (QSP) modeling is used to characterize biological systems, disease progression and drug pharmacology. As an example in the field physics and engineering, fluid dynamics modeling is used to model, for example, fluid flow and heat transfer.

Figure 14:
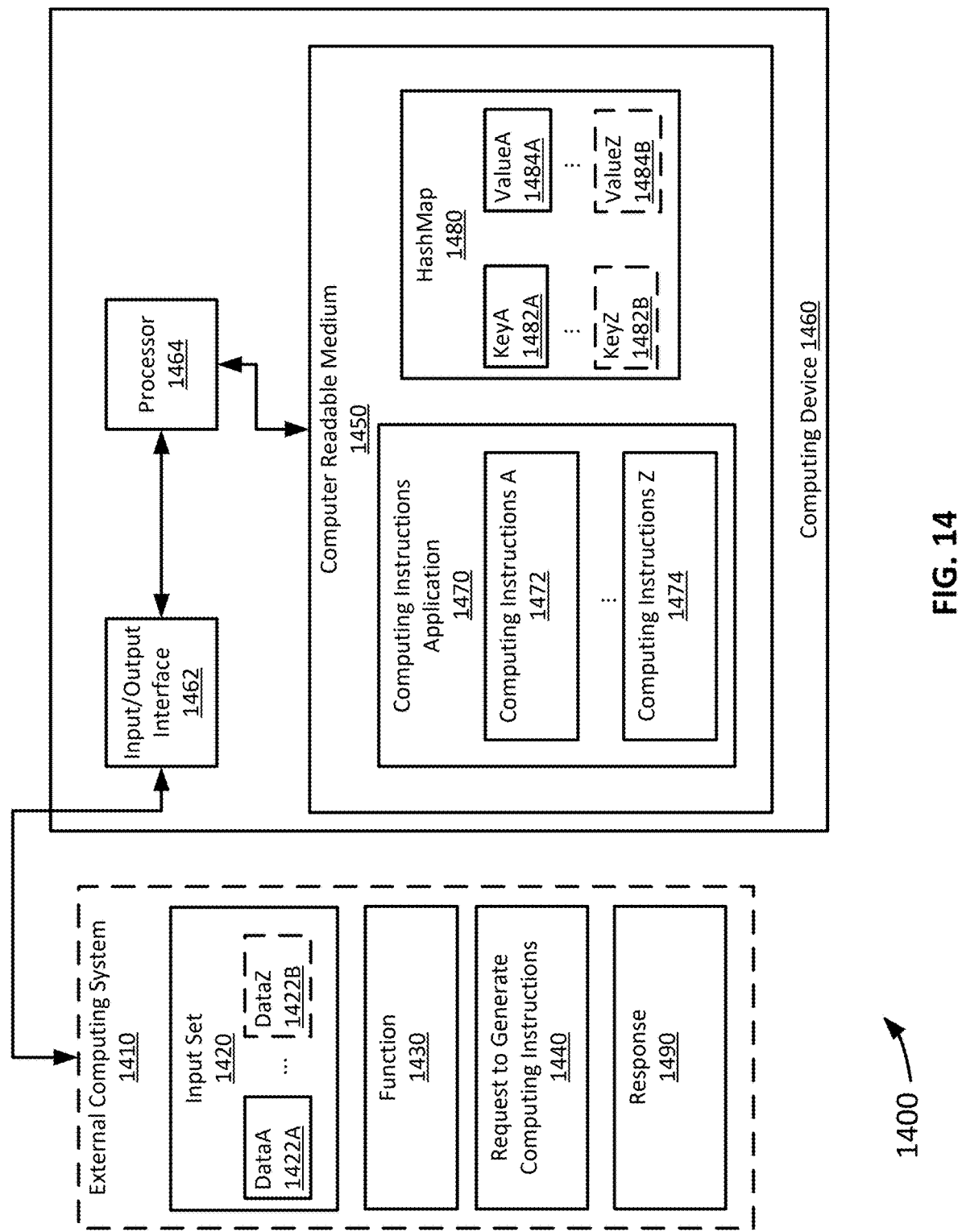
FIG. 14 illustrates a block diagram of a system for sending a response to a function according to at least one embodiment of the present technology.

FIG. 14 illustrates a block diagram of a system 1400 for sending a response 1490 for a function 1430. System 1400 includes a computing device 1460 (e.g., implementing a compiler). The system 1400 is configured to exchange information between devices in the system (e.g., via wired and/or wireless transmission). For example, a network (not shown) can connect computing device 1460 to an external computing system 1410. Alternatively, or additionally, the system 1400 is integrated into computing device 1460.

The computing device 1460 has input and/or output interface(s) 1462 for receiving information (e.g., function 1430) and sending information (e.g., response 1490). The computing device 1460 can receive a request 1440 to generate computing operations to effectuate the response 1490 for the function 1430 to an input set 1420. For instance, effectuating the response 1490 could include generating derivative operations for the function 1430 with respect to an input of the input set 1420. The input and/or output interface(s) 1462 can also receive the input set 1420 that can include one or more inputs 1422. The computing device 1460 can receive the input set 1420 and/or function 1430 as part of the request 1440 or separately. The input and/or output interface(s) 1462 can include an external interface for receiving information from an external computing system 1410 or an input device. Alternatively, or additionally, it can include an internal interface such as interfaces for receiving input to the computing device 1460 (e.g., a touchscreen), or exchanging information within computing device 1460 (e.g., between different programs).

The computing device 1460 has a computer-readable medium 1450 and a processor 1464. Computer-readable medium 1450 is an electronic holding place or storage for information so the information can be accessed by processor 1464. Computer-readable medium 1450 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1464 executes instructions (e.g., stored at the computer-readable medium 1450). The instructions can be carried out by a special purpose computer, logic circuits, or hardware circuits. In one or more embodiments, processor 1464 is implemented in hardware and/or firmware. Processor 1464 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1464 in one or more embodiments can retrieve a set of instructions from a permanent memory device and copy the instructions in an executable form to a temporary memory device that is generally some form of RAM, for example. Processor 1464 operably couples with components of computing device 1460 (e.g., input interface 1404, with output interface 1406 and with computer-readable medium 1450) to receive, to send, and to process information.

In one or more embodiments, computer-readable medium 1450 stores instructions for execution by processor 1464. In one or more embodiments, one or more applications stored on computer-readable medium 1450 are implemented in software (e.g., computer-readable and/or computer-executable instructions) stored in computer-readable medium 1450 and accessible by processor 1464 for execution of the instructions. The one or more application can be integrated with other analytic tools. Merely for illustration, the applications are implemented using or integrated with one or more SAS® software tools such as JMP®, Base SAS, SAS® Enterprise Miner™ SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®. For instance, in SAS® analytics, derivatives are calculated (e.g., for model prediction) using a 4GL known as the SAS® Function Compiler (CMP). A software differentiator is built into CMP to support derivative computation for various SAS® products. In one or more embodiments, the computing device 1460 is a compiler that translates computer instructions in a source code format into machine-executable code format. The request 1440 can be in a source code format. The computing device 1460 generates computing instructions in a machine-executable code format.

For example, in one or more embodiments, the computer-readable medium 1450 comprises computing instructions application 1470 for generating computing instructions responsive to the request 1440 to generate computing operations. For example, the computing instructions application 1470 can generate a hashmap data structure 1480 and allocate memory locations for the hashmap data structure 1480 in computer-readable medium 1450. The hashmap data structure 1480 indexes respective data storage associated with a respective key 1482 and can sometimes be referred to simply as a hashmap or a hashtable. The hashmap data structure 1480 can have one key or multiple keys. In embodiments, the computing instructions application 1470 can generate a first set of computing instructions 1472 (e.g., in a machine-executable code format) to solve a first component for a given function (e.g., a derivative order for a function 1430). In one or more embodiments, the computing instructions application 1470 can execute the first set of computing instructions and generate a first hash key 1482A for the hashmap data structure 1480. The first hash key 1482A represents one or more executions of the first set of computing instructions. For instance, the first set of computing instructions 1472 could be for solving a first order derivative of function f(x) and the first hash key 1482A could represent a first derivative of f(x). The computing instructions application 1470 stores the first hash key 1482A in the hashmap data structure 1480 to index a storage location in the hashmap data structure 1480 (e.g., value 1484A).

In one or more embodiments, the computing device 1460 can continue to carry out operations for building the hashmap data structure 1480 for multiple different instruction components. For instance, the computing instructions application 1470 generates a second set of computing instructions 1474 (e.g., in a machine-executable code format) to solve a second component for the function. For instance, the second set of computing instructions 1474 could relate to a second derivative order for the function f(x). The computing instructions application 1470 executes the second set of computing instructions 1474 by using the first hash key 1482A to retrieve data indexed by the first hash key (e.g., in value 1484A). For instance, retrieved data could include a given input to the function, a representation of the derivative order and/or a function. Controlling the hashmap data structure 1480 to have this data and process for retrieval improves computation accuracy. For instance, using the hashmap data structure 1480 could include deviating from typical recursive operations, which introduce rounding errors. Example hashtables are described in more detail with respect to FIGS. 16A-16E.

In one or more embodiments, the computing device 1460 can continue to construct the hashmap data structure 1480 for multiple different instruction components not specifically shown in system 1400. For instance, the computing instructions application 1470 can generate a second hash key 1482B. The second hash key represents multiple executions of the second set of computing instructions 1474. the computing instructions application 1470 store the second hash key in the hashmap data structure to index a storage location in the hashmap data structure 1480. The computing instructions application 1470 can generate a third set of computing instructions to solve a third component of the function (e.g., related to a third derivative order for the function f(x)). The computing instructions application 1470 can execute the third set of computing instructions by using the second hash key 1482B to retrieve data indexed by the second hash key. The data indexed by the second hash key comprises a representation of the one or more executions of the first set of computing instructions.

In one or more embodiments, the computing system determines that an operation is a final execution of a last set of computing instructions for the function and sends, based on an output from the final execution, the response 1490 for the function 1430 to the input set 1420. Responses utilizing methods, devices and systems herein can provide generation of computing instructions for generating a more accurate response. This can improve systems and processes relying on that response. For instance, model prediction can utilize derivative functions solutions.

In one or more embodiments, fewer, different, and additional components can be incorporated into computing device 1460. For instance, input and/or output interface(s) 1462 could be multiple different interfaces that use the same or different interface technology. Alternatively, or additionally, input and/or output interface(s) 1462 is a same interface that supports both input and output function.

In one or more embodiments, a computing system (e.g., the system 1400 or computing device 1460) implements a method as described herein (e.g., a method shown in FIG. 15) for generating instructions for sending a response to a function.

Figure 15:
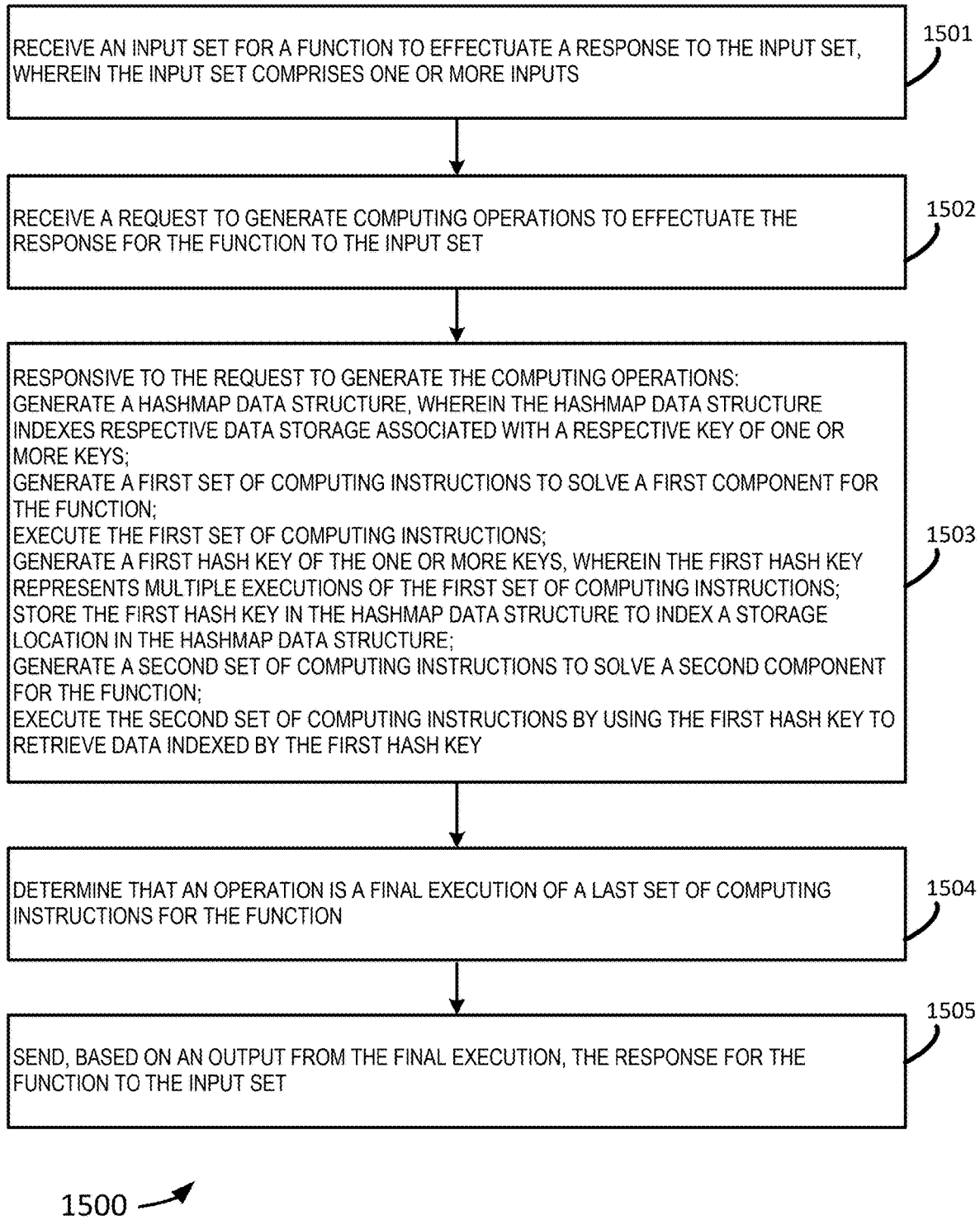
FIG. 15 illustrates a flow diagram for sending a response to a function according to at least one embodiment of the present technology.

FIG. 15 illustrates a flow diagram for a method 1500 for sending a response (e.g., response 1490) to a function (e.g., function 1430). The method 1500 comprises an operation 1501 for receiving an input set for a function to effectuate a response to the input set. The input set includes one or more inputs. The method 1500 comprises an operation 1502 for receiving a request to generate computing operations to effectuate the response for the function to the input set.

The method 1500 comprises an operation 1503 for action(s) responsive to the request to generate the computing operations. For instance, the action(s) can include generating a hashmap data structure (e.g., the hashmap data structure 1480). The hashmap data structure indexes respective data storage associated with a respective key of one or more keys. The action(s) can include generating a first set of computing instructions to solve a first component for the function. The action(s) can include executing the first set of computing instructions. The action(s) can include generating a first hash key of the one or more keys. The first hash key represents multiple executions of the first set of computing instructions. The action(s) can include storing the first hash key in the hashmap data structure to index a storage location in the hashmap data structure. The action(s) can include generating a second set of computing instructions to solve a second component for the function (e.g., related to a derivative order as the first component). The action(s) can include executing the second set of computing instructions by using the first hash key to retrieve data indexed by the first hash key. Operations 1503 could have other action(s), not specifically shown (e.g., for additional components).

The method 1500 comprises an operation 1504 for determining that an operation is a final execution of a last set of computing instructions for the function. For instance, the function could require solving six derivative orders and the last set of computing instructions is for the sixth derivative order.

The method 1500 comprises an operation 1501 for sending, based on an output from the final execution, the response for the function to the input set.

Figure 16A:
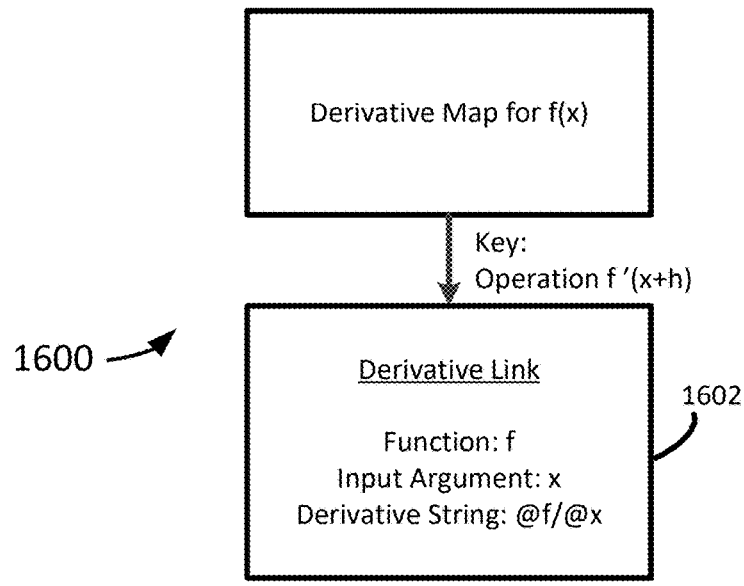

FIGS. 16A-16E illustrate a hashmap construction (e.g., using the method 1500 of FIG. 15). FIG. 16A shows a first derivative map 1600 based on computer generation of a first key for a first derivative function for f(x), in this case f'(x+h). A computing system can store the first derivative map 1600 in a hashmap data structure that indexes respective data storage by storing a pointer to a memory address in a hash value associated with a respective hash key. The hash value can store multiple items (e.g., by referencing a section of consecutive memory location(s) or by using a linked list to reference different storage locations). Here the hash value stores a derivative link 1602 with function, input argument and a text string indicating derivative operations represented in a computer code. For example, the text string can include one or more symbols representing an order of derivatives such as "@f/@x" for a first order derivative. This derivative link 1602 makes the hashmap a derivative map for f(x) and hashmap and derivative map can be used interchangeably.

A derivative link is a specialized structure designed to maintain a reference to the original function and its associated operations. The hashmap leverages the derivative from a specific iteration as a key to reference its initial input function. For example, f'(x+h) can serve as a key to retrieve f(x).

This design ensures traceability across iterations, as f'(x+h) is treated as the input when calculating f"(x+h2). For first-order numerical differencing, a derivative link is created and added to the hashmap, using the resulting derivative f'(x+h) as the hash key. This approach directly associates f'(x+h) with its original function f(x), enabling quick referencing for subsequent derivative calculations. In some cases, h can be zero in which case the key could be, for instance, f'(x). By iteratively building the hashmap under these conditions, the system creates a robust mechanism to establish a clear and efficient path back to the original function f(x).

Figure 16B:
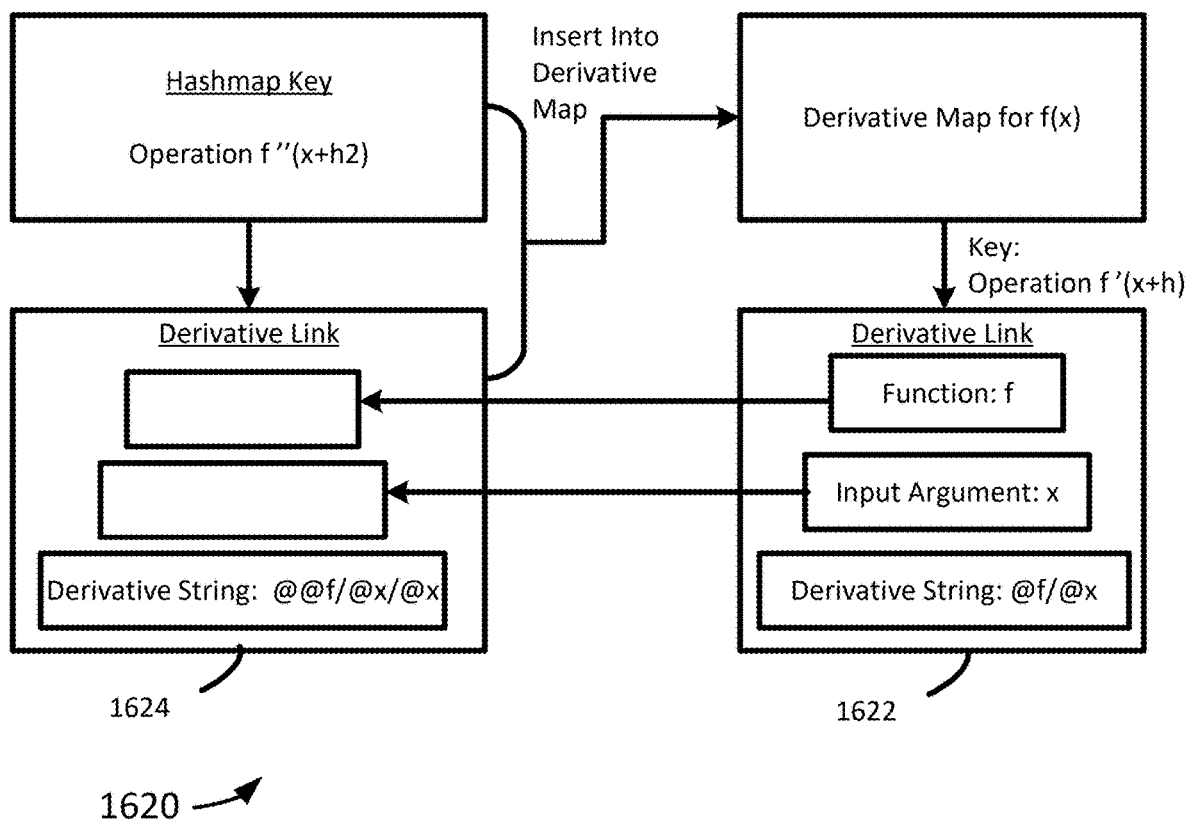

FIG. 16B shows a diagram 1620 for operations to extend the first derivative map 1600 to a second order derivative. For second-order derivatives, the input argument to the differentiator, based on the iterative design, is f'(x+h). Therefore, if the object variable is x and the requested derivative is f"(x+h2), the system uses f'(x+h) to look up the corresponding derivative link 1622 in the hashmap. This lookup retrieves the original function f(x), as established in the first-order calculation.

Figure 16C:
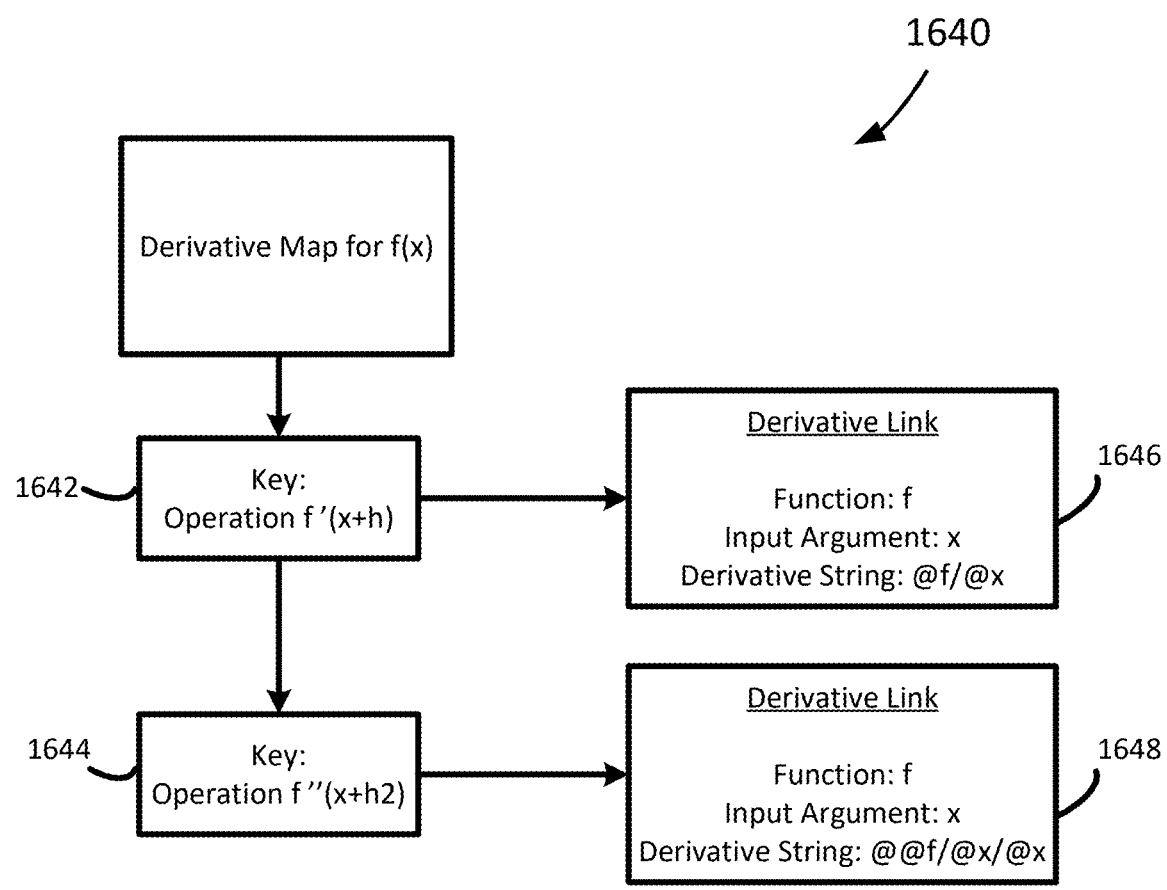

Once the original derivative link containing f(x) is obtained, the system generates a new derivative link 1624. This new link is associated with the resulting second-order derivative f"(x+h2), which becomes a new hash key. FIG. 16C shows a resulting derivative map 1640 with two derivative orders. As shown in FIG. 16C, the data indexed in derivative link 1646 indexed by a first hash key 1642 includes an indication of a first order derivative. The data in derivative link 1648 indexed by the second hash key 1644 comprises an indication of a second order derivative.

Figure 16D:
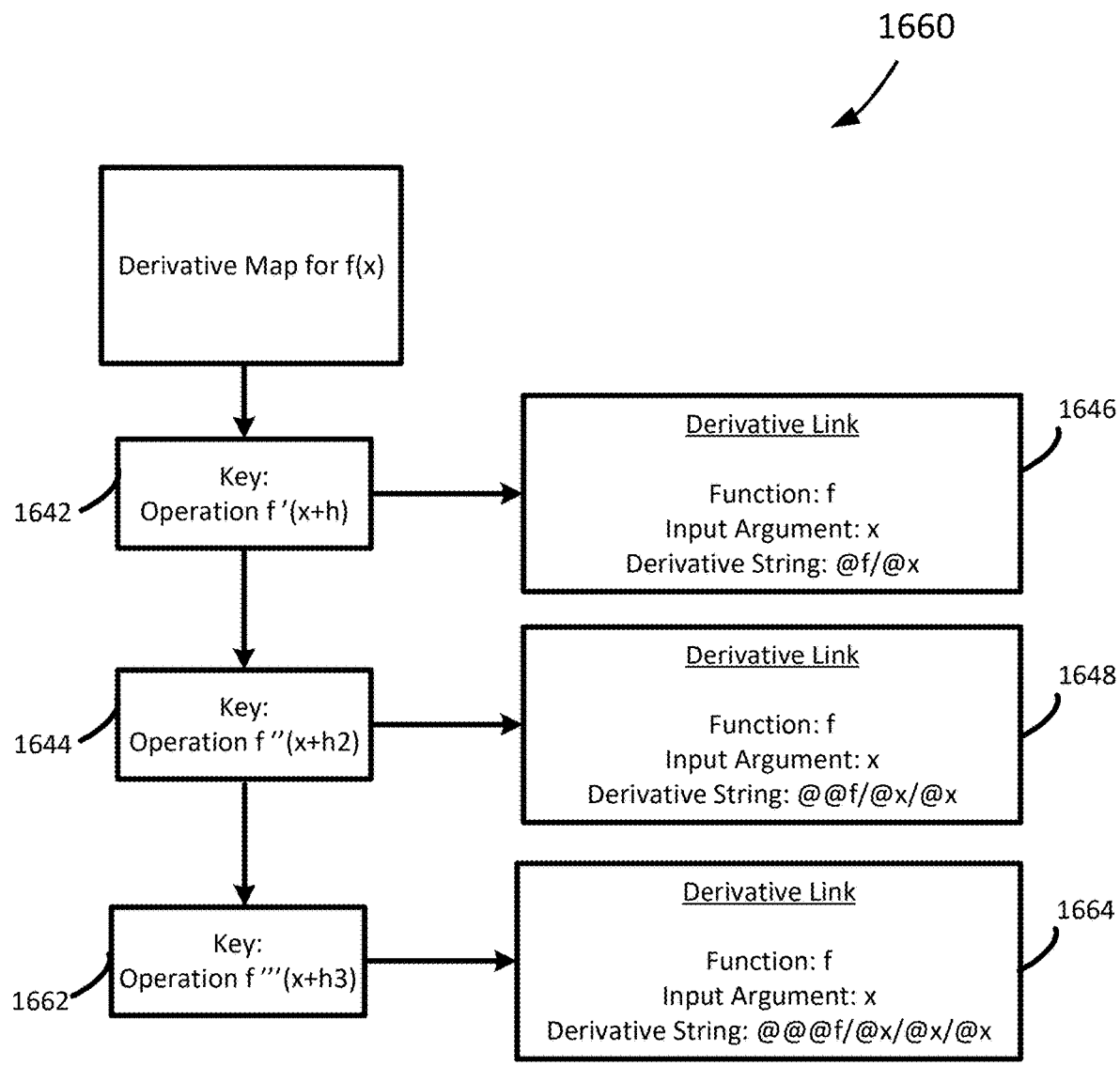

This approach can be carried on for any number of iterations to achieve higher order derivatives. FIG. 16D shows as an example a derivative map 1660 extending the keys and derivative links in the derivative map 1640 to include hash key for f'"(x+h3) in key 1662 and resulting derivative link 1664 indicating a third order derivative. As shown each key is based on the function f, an input to the function x, and a delta that is specific to a respective key and modifies the input (e.g., "h", "h2", "h3"). In embodiments, deltas can each be independent and unique from one another. Deltas can be zero.

FIG. 16E shows an example hash map data structure 1680 where the final execution of the last set of computing instructions corresponds to a six-order derivative. The final execution could correspond to different derivative operations, which would influence the quantity of keys represented in keys column 1682 and the values that correspond to the keys represented in column 1684.

Figure 17A:
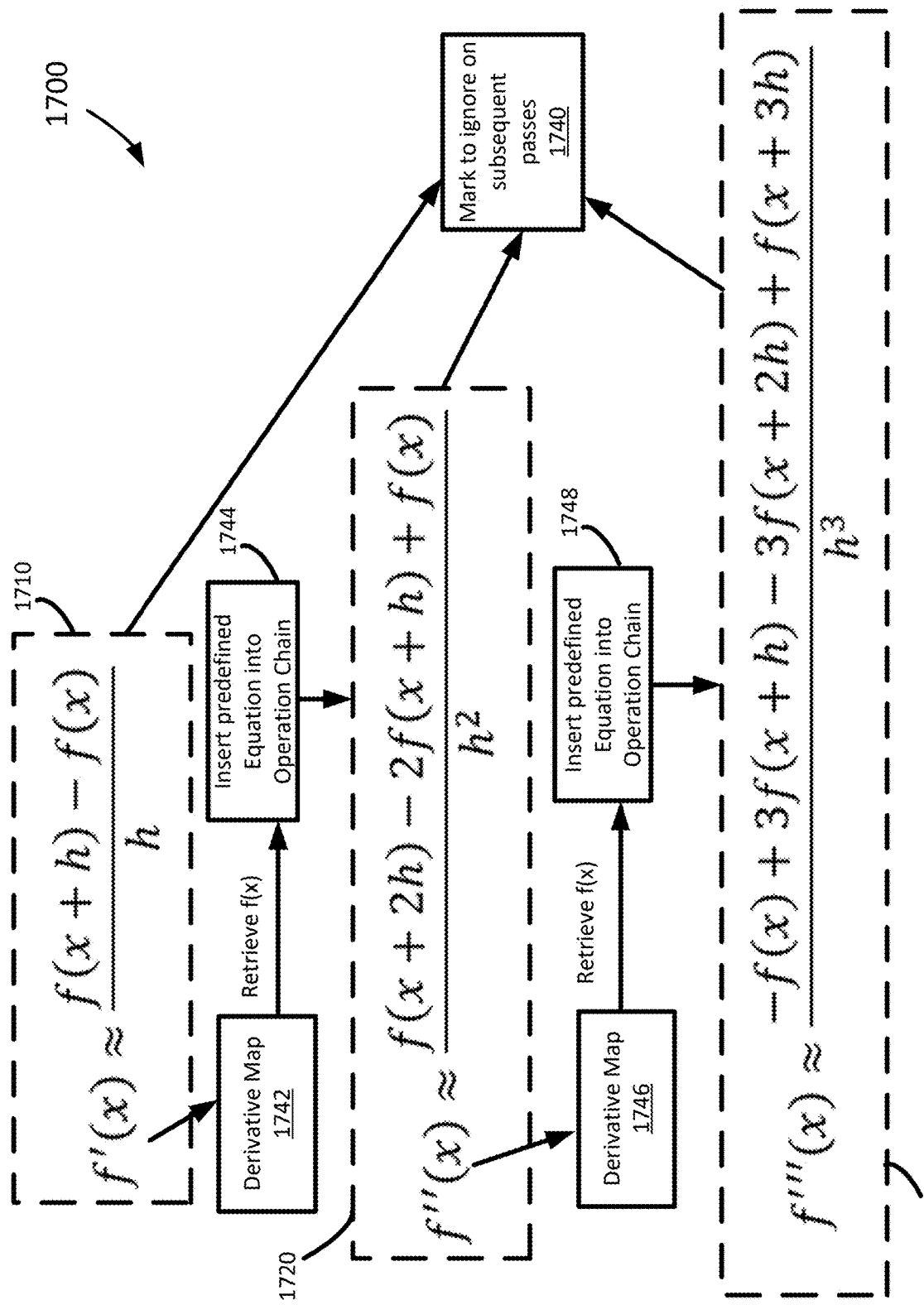

FIG. 17A illustrates a flow diagram 1700 for use of a hashmap for operations corresponding to a finite difference method. A finite difference is a mathematical expression of the form f(x+b)−f(x+a) and is used to approximate derivatives. FIG. 17A uses a basic forward finite difference method for f'(x) in equation 1710 as an example to determine a delta. Different finite difference methods could be used such as basic backward finite difference method or central finite difference method. A basic backward difference method uses the function values at x and x−h, instead of the values at x+h and x to determine the delta in the basic forward finite difference method. The central difference method instead uses x+h/2 and x−h/2 to determine the delta. A computing system uses the difference methods in conjunction with difference weights to determine the co-efficient for the numerator of each of the equations with respect to a particular derivative and accuracy level.

FIG. 17B shows a table 1750 of finite difference weights for a basic forward finite difference method. The equations in FIG. 17A correspond to the finite difference weights for an accuracy level of 1 as an example. For instance, equation 1710 corresponds to the difference weights in row 1752, equation 1720 corresponds to the difference weights in row 1754, and equation 1730 corresponds to the difference weights in row 1756. Different weight tables would be applicable for other finite difference methods and are available in the art.

Traditional methods for computing finite difference methods to solve numeric differentiation computations allowed for recursive operations such that previous computations for f(x) were repeated in response to a request for generating computing operations. For instance, computations as results of the existing iterative design including a first order:

$$f'(x) \approx \frac{-f(x) + f(x+h)}{h}$$

Then a second order would include computations for:

$$f''(x) \approx \frac{-f'(x) + f'(x+h)}{h}$$

In the iterative design, a computing system references prior derivatives as inputs to calculate higher-order derivatives during subsequent differentiation passes. However, using an approach described herein to directly compute higher-order derivatives using predefined coefficient equations that depend exclusively on the original function f(x), the improved computing system ignores operations associated with these equations in subsequent passes. This ensures that the calculations remain accurate and unaffected by redundant or conflicting operations from prior iterations.

In the example in FIG. 17A, following computation of a derivative (e.g., in equation 1710), rather than recomputing these values, computer instructions can be marked with a generated computer indication to ignore additional operations from computing instructions on subsequent passes of those computing instructions during recursive operations (e.g., in a stage 1740). This computer indication can allow a computing system to deviate from one or more recursive operations for a numeric differentiation computation. For instance, if a first set of computing instructions were used to execute operations to compute the first order derivative in equation 1710, when the computing system executes a second set of computing instructions to compute the second order derivative in equation 1720, the computing system can execute the second set of computing instructions by generating a computer indication to refrain from generating additional operations from the first set of computing instructions. Instead, the computing system will use the derivative map in stage 1742 to retrieve f(x) and insert a predefined equation into operation chain using stage 1744 and mark to ignore operations for the second order derivative using stage 1740. As another example, when computing the third order derivative in equation 1730, the computing system will use the derivative map in stage 1746 to retrieve f(x) and insert a predefined equation into operation chain using stage 1748 and mark to ignore operations for the second order derivative using stage 1740.

Directly inserting the formulas (e.g., using stages 1744 and stages 1748) introduces new computing flexibility. Different and optimized delta values "h" (e.g., for a finite difference method) can be used for each derivative order, allowing precise adjustments for specific needs. Additionally, varying levels of accuracy (e.g., for different difference weights from FIG. 17B) can be applied to different orders, striking a balance between computational efficiency and precision.

One or more embodiments can address challenges in numerical differentiation by allowing the seamless integration of pre-formulated coefficients into a complier differentiator. The compiler can maintain a reference to the original function through a hashmap of derivative links (e.g., hashmap described in FIGS. 16A-16E). The iterative hashmap of derivative links is a dynamic structure that iteratively builds and references derivative links, allowing each derivative to trace back to its original function f(x). This ensures continuity and accuracy across calculations. Embodiments also prevent redundant differentiation by flagging and ignoring operations from prior passes. This prevents extra inserted operations from getting incorrectly differentiated multiple times. These features ensure accurate and efficient higher-order derivative calculations. For instance, flagging and ignoring operations from prior derivative iterations can ensure the accuracy of higher-order derivative calculations using the predefined coefficient formula. This approach prevents unnecessary interference from intermediate steps, enabling the formula to rely solely on the original function f(x).

When executing analytic procedures, the computation of mathematical derivatives plays a critical role in estimating probabilities for a given set of variables. For instance, in SAS® analytics, derivatives are calculated using a 4GL known as the SAS® Function Compiler (CMP). A software differentiator is built into CMP to support derivative computation.

In CMP, the differentiator takes as input a set of functions, F={f, g, . . . }, where each function is defined by its own linear sequence of program statements. It also processes a set of input variables, X={x, y, . . . }, which are evaluated against the functions in F. Additionally, a subset of these variables, known as the with-respect-to variables W⊂X, is provided. These inputs collectively enable the computation of derivatives for the functions in F with respect to the variables in W. An example, derivative statement with CMP includes der F/W. Derivative statements are noted used an "@" symbol allowing second, third, and subsequent derivatives to be easily expressed. For example, @F/@W for a first order derivative of F with respect to W; @@F/@W/@W for a second order derivative of F with respect to W; and @@@F/@W/@W/@W for a third order derivative of F with respect to W.

In cases where higher-order derivatives are required, the differentiator employs an iterative approach. This involves using the output of one differentiation pass as the input for the next. For example, the first derivative f'(x) is computed and then used as the input function to calculate the second derivative f"(x). This iterative process allows the system to build successive derivatives incrementally, enabling the computation of derivatives of any order while maintaining consistency with the initial inputs.

Due to the iterative nature of the differentiation technique employed by the CMP differentiator, challenges emerged when attempting to integrate pre-calculated higher-order derivative formulas. Since these formulas directly compute higher-order derivatives, embodiments establish a clear path back to the original function. Additionally, embodiments mark and ignore directly inserted operations from previous differentiation passes. The new technique directly inserts the completed formula for higher-order derivatives, bypassing the iterative design. Since the inserted formula fully calculates the entire derivative for a given order, the computing system ignores any prior operations for that calculation.

To calculate a second or higher-order derivative, such as f"(x), using the predefined formula, a computing system accesses the original function f(x). To address this, embodiments, maintain a reference to the original function while seamlessly integrating with the iterative design of the CMP differentiator. For instance, one or more embodiments use an iterative Hashmap of Derivative Links (e.g., the one shown in FIGS. 16A-16E). Embodiments also mark and exclude operations from previous differentiation passes when applying the predefined coefficient formula. This ensures that only the relevant calculations are considered, avoiding interference from prior iterations.

Figures 18A, 18B:
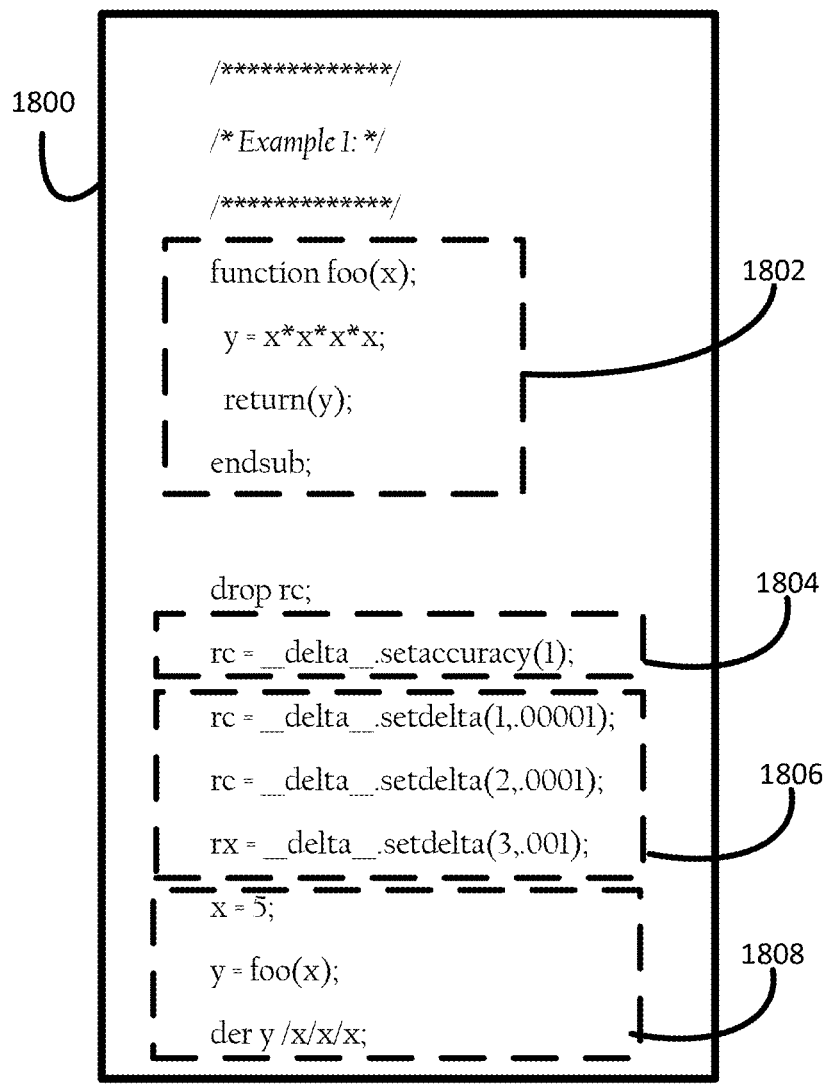

FIGS. 18A-18G illustrate computing operations corresponding to finite difference method generated by a compiler. This example uses a forward finite difference method, but a computing system could use other difference methods. FIG. 18A shows an application programming interface (API) 1800 displaying code corresponding to executing an example function foo when x is five. This code can be for example, target code from a compiler that translates source code into a target code that is machine-executable. Section 1802 corresponds to code defining the function foo.

In one or more embodiments, a computing system receives a level of accuracy for computation of one or more components for the function (e.g., accuracy levels corresponding to accuracy levels in FIG. 17B). Sections 1804 and 1806 correspond to code for a computing system to receive a set of objects for the computing system to generate a set of deltas (e.g., for a finite difference method).

For instance, section 1804 provides code for a computing system to receive an accuracy level for one or more members of the set of objects. In this case, a single accuracy level is set using notation "_delta_.setaccuracy(1)" for the derivative operations of the finite difference method. A computing system receiving this object can determine to solve the function using numerical analysis responsive to a request to generate computing operations to solve the function. The request can be explicit or implicit (e.g., no analytic method is available). Analytic methods are used to find an exact answer whereas numeric methods allow for approximation. In other embodiments, accuracy can be set per derivative level as shown in other examples. As another example, the accuracy levels could be default values, and the computing system determines to use numerical analysis and these default values when analytical methods are not available or impractical given processing constraints.

Section 1806 provides the value of "h" in the finite difference method with respect to a particular derivative order of three derivative orders using notation "_delta_.setdelta(order, delta)". For instance, a first derivative order or "1" has an h value of 0.0001, a second derivative order or "2" has an h value of 0.001, and a third derivative order or "3" has an h value of 0.001. Using this information a computing system can generate computing operations based on the set of objects and accuracy level (e.g., computing operations to select a set of finite difference weights for recursion relations based on the level of accuracy).

Section 1808 corresponds to code providing the request to generate computing operations to effectuate the response of function foo when the input argument is x=5. Responsive to the request, a computing system can generate hashmap data structures as described with respect to FIGS. 16A-16E and FIG. 17A, and computing instructions to solve the function using numerical analysis.

FIG. 18B shows an application programming interface 1810 with computer code corresponding to the program starting for the received information and responsive to the request to generate the computing operations. FIG. 18C shows an application programming interface 1820 with a section 1822 corresponding to execution of code for execution of f(x) where x is equal to 5. Section 1824 shows intermediate results for when x=5 and corresponds to:

$$f(X)=x^4 \to f(5)=625$$

In this example, each delta in the set of deltas received by the computing system is associated with a unique set of computing instructions and a unique member of the set of objects. For instance, section 1825 corresponds to computer code for determining a first order derivative when delta or "h" is equal to 0.00001. Here this component of code in section 1825 is based on the input x modified by h so that x=5.0001 within the executed code. Section 1827 shows the derivative results and delta for a first order derivative represented in computer code using one or more symbols (i.e., "@y/@x") and is approximated in the below function that serves as a reference to the target values:

$$f'(x)=4x^3 \to f'(5)=500$$

FIG. 18D shows an application programming interface 1830 with computer code corresponding to operations for the second order derivative. For instance, section 1835 corresponds to computer code for determining a second order derivative when delta or "h" is equal to 0.0001. Here this component of code in section 1835 is based on the input x modified by h so that x=5.001 within the executed code. Section 1837 shows the derivative results and delta for a second order derivative and is approximated in the below function:

$$f''(x)=12x^2 \to f''(5)=300$$

FIGS. 18E-18F show an application programming interface 1840 and application programming interface 1850 with computer code corresponding to operations for the third order derivative. Here this component of code in section 1845 is based on the input x modified by h so that x is equal to 5.001 within the executed code. Section 1852 shows the derivative results and delta for the third order derivative and is approximated in the function:

$$f'''(x)=24x \to f'''(5)=120$$

FIG. 18G shows a representation of a hashmap 1860 for a first, second, third, and fourth derivative. Key column 1862 shows keys with different deltas, and value 1864 would correspond to respective derivative links for the function as described with reference to FIGS. 18A-18F.

In this example, there is a known derivative result, but the example is used to show the improvements to model prediction by reducing the size of the error for derivative computation when using numeric differencing. Model prediction can utilize derivative computations. In some embodiments, when a derivative is known to a compiler differentiator, it is immediately substituted and used. Certain functions cannot be derived using an analytical approach and instead require a numerical differentiation method. For instance, for many problems, there is no known derivative, particularly for non-linear equations, so a numeric differencing algorithm is used to estimate the derivative. One example of a numeric differentiation method is a forward finite differencing technique defined by the following formula:

$$f'(x) \approx \Delta_h[f](x) = \frac{-f(x)+f(x+h)}{h}$$

Traditional compilers calculating derivatives of order greater than one relied on an iterative process. For instance, when using a fast-forward differencing technique, calculating derivatives of order greater than one, the CMP differentiator relies on an iterative process. Calculating higher-order derivatives involves repeatedly applying the forward differencing equation to achieve the desired result. For instance, equation 1720 presents a simplified form of the following operations of inserting f'(x) according to:

$$f''(x) \approx \Delta_h^2[f](x) = \frac{\frac{-f(x)+f(x+h)}{h} + \frac{-f(x+h)+f(x+2h)}{h}}{h}$$

This iterative approach mandates that the same value of h be used across each iteration. For second order and higher derivatives, this becomes problematic. Due to the $h^n$ denominator in the final equation, for the nth order derivative, rounding errors are introduced for precise enough values of h. Use of numeric differencing algorithms can yield relative errors that are often large, when compared to a known result.

Embodiments improve model prediction by reducing the size of the error for derivative computation when using numeric differencing. Traditional numeric differencing algorithms can yield relative errors that are often large, when compared to a known result. For instance, existing computing operations would not allow unique deltas for derivative orders and would instead have a same delta (h) across all differentiation iterations. This would likely yield a very erroneous result. For example, using the same function and a delta of 0.00000001 using traditional computer numeric differencing methods, in a first example, the output would correspond to y=625 for f(x); @y/@x=500.00001011 for first order derivative; @@y/@x/@x=−2273.736754 for second order derivative; and @@@y/@x/@x/@x=454747350886 for third order derivative.

When using a delta value of 0.00000001, the first order derivative (@x/@y) maintains good accuracy and precision. However, any derivative approximation above first order quickly becomes unusable due to significant rounding errors in the intermittent derivative calculations.

One potential way to reduce rounding errors is to reduce the precision of h. However, if a lower precision h is used, final accuracy of the approximation is still heavily sacrificed because the first order approximation is sacrificed. For example, using the same function and a delta of 0.01 using traditional computer numeric differencing methods in a second example, the output would correspond to y=625 for f(x); @y/@x=501.502001 for first order derivative; @@y/@x/@x=301.2014 for second order derivative; and @@@y/@x/@x/@x=120.35999987 for third order derivative.

Embodiments improve these traditional methods. For instance, as shown in FIGS. 18A-18G, embodiments provides a new compiler object "delta" allowing a user to access new functionality in embodiments. The application programing interface allows a user to set the accuracy level(s) that will be used for numeric differencing for the program and to set specific numeric differencing delta values for a given derivative order.

FIG. 19 illustrates improvements to accuracy in computing operations in a table 1900 using traditional methods and embodiments. Differences in features are specified in features column 1960. Analytical column 1910 shows references values for an analytical method for each derivative. Column 1920 provides features corresponding to the first example using traditional computing numeric differences described above. This first example had a small delta (0.0000001) and had significant accuracy issues in the derivative results. Column 1930 provides features corresponding to the second example using traditional computing numeric differences described above. This second example had a large delta (0.01) which is better than example 1 but still sacrificed accuracy. Column 1940 corresponds to the computing operations in FIGS. 18A-18F, which allowed for variable accuracy and an accuracy level of 1. The derivative results are much closer to the analytical results. By further refining the input differentiation parameters, the results can be improved even further. Example 4 uses the computing approach in FIGS. 18A-18F, but uses the parameters shown in column 1950 including setting the accuracy level to 4 and uses greater deltas for the derivatives as shown in column 1950. By fine tuning the differentiation parameters used with the new functionality, a computing system can produce results in the given example program that are precise and accurate enough to round to the exact answer when solved analytically.

As shown in table 1900 approaches described herein can minimize rounding errors through elimination of intermediary iterative calculations, which allows for higher precision delta values to be used. It allows different delta values to be set for each derivative order, letting the user fine tune the ideal delta for each order.

One use of derivative operations is in optimization of nonlinear models such as nonlinear mixed models, generalized nonlinear models, and differential equation-based models. Differential-equation based models are nonlinear models generated from a set of differential equations. Typically, there is not an analytical option available for nonlinear model optimization, requiring numerical analysis. Precision is important in numerical analysis. For instance, the precision of computing the derivatives for numerical analysis has a high impact on how the optimization technique behaves.

For example, a numerical analysis for a nonlinear function f could have an objective to either maximize or minimize the function with respect to θ, such as:

maxf(θ) for θ∈Θ

One such numerical approach is the Newton-Raphson optimization technique that uses a first and second derivative (e.g., denoting g(θ) as a first order derivative and H(θ) as a second order derivative of this function). A computing system starts with an initial $\theta_0$ and then a computing system determines a next θ according to this formula where step size is α and g transpose H inverse is the step direction:

$$\theta_{i+1} = \theta_i + \alpha \times g^1 H^{-1}$$

A computing system repeats this process until in the successive iterations the θ are very close to each other. Then the computing system stops with an optimized value according to the θ. For instance, the computing system terminates further operations based on a tolerance level ε. such as:

$$\|\theta_{i+1} - \theta_i\| \le \epsilon$$

Ideally, the tolerance level ε for the termination criteria should be less than 1e-8 (e.g., ε=1e$^{-8}$). Achieving such a small tolerance is feasible typically when the objective function and its derivatives have full precision, around 1e-16 for most of the machines. However, when complete precision is not available—such as in the case of solutions derived from differential equations or derivatives computed using the finite difference approach—setting the termination tolerance as small as 1e-8 may lead to instability in the optimization process. In situations where function and derivative precision are compromised, the achievable tolerance levels are typically limited to 1e-3 or 1e-2.

There are other methods for termination including a parameter-based termination criteria, function-based criteria, and gradient based-criteria. One example of parameter-based termination includes, where k is an iteration value, and $\theta_j^{(k)}$ is the value of the $j^{th}$ parameter at the $k^{th}$ iteration:

$$\frac{\max_j |\theta_j^{(k)} - \theta_j^{(k-1)}|}{\max(|\theta_j^{(k)}|, |\theta_j^{(k-1)}|)} <= \epsilon$$

One example of function-based termination includes:

$$\frac{|f(\theta^{(k)}) - f(\theta^{(k-1)})|}{|f(\theta^{(k)})|} <= \epsilon$$

One example of gradient based-criteria termination includes:

$$\frac{g(\theta^{(k)})' H(\theta^{(k)})^{-1} g(\theta^{(k)})}{|f(\theta^{(k)})|} <= \epsilon$$

There are other model optimization techniques including quasi-Newton methods that approximate the second order derivatives and conjugate gradient techniques that uses only a first order derivative without a second order derivative. Embodiment can improve derivative computations for these model optimization techniques.

For example, a differential-equations-based model called one-compartmental model used in the pharmacokinetics field is derived for the amount of the drug A in the body at a given time t:

$A(t) = D \times \exp(-k_e \times t)$, where

D is the number of units of a dosage $k_e$ is the elimination rate.

This is derived from a differential equation for drug movement within a body $$\frac{dA(t)}{dt} = -k_e \times A$$

and has analytical solution:

$A(t) = D \times \exp(-k_e \times t)$

However, there can be more complex models using a set of differential equations without an analytical solution. For instance, for this pharmacokinetics scenario an example of a model derived from a three-dimensional set of differential equations includes the parent and metabolite model from J. Fidler-Kelley and J. S. Owen available in Introduction to Population Pharmacokinetic/Pharmacodynamic Analysis with Nonlinear Mixed Effects Models (2014). This model is derived from the following derivatives:

$$\frac{dA_1(t)}{dt} = -(k_a \times A_1)$$

$$\frac{dA_2(t)}{dt} = -(k_a \times A_1) - (K_{20} \times A_2) - \frac{V_{max} \times A_2}{K_m + A_2}$$

$$\frac{dA_3(t)}{dt} = -(k_{30} \times A_3) + \frac{V_{max} \times A_2}{K_m + A_2} \times MPR$$

The one-compartment model assumes that the observed data (y) follows a normal distribution:

$y \sim \text{Normal}(\mu, \sigma^2)$ where $\mu = A(t)/\text{scale}$

To fit the one-compartment model, once the data y is collected, the goal is to minimize the logarithm of probability density function (PDF) of normal distribution: log pdf ('normal', y, $\mu$, $\sigma^2$) with respect to $k_e$ or any other parameters influencing its value. In practice $k_e$ is often expressed as $\exp(\beta_1)$ to ensure it remains positive. Consequently, $\beta_1$ becomes the final parameter in the one-compartment model. Thus, fitting the one-compartment model requires minimizing log pdf('normal', y, $\mu$, $\sigma^2$) with respect to $\beta_1$.

In the one-compartment model, solving the differential equation:

$$\frac{dA(t)}{dt} = -k_e \times A$$

using a differential equations solver can lead to reduced precision in the objective function log pdf('normal', y, $\mu$, $\sigma^2$). Further to optimize this model, computing the derivative of the logarithm of the probability density function (PDF) with respect to the $\beta_1$ is essential:

$$\frac{\partial \log pdf('\text{normal}', y, \mu, \sigma^2)}{\partial \beta_1}$$

This derivative with respect to $\beta_1$ can be expressed using the chain rule:

$$\frac{\partial \log pdf('\text{normal}', y, \mu, \sigma^2)}{\partial \mu} \times \frac{\partial \mu}{\partial A_1} \times \frac{\partial A}{\partial K_e} \times \frac{\partial K_e}{\partial \beta_1}$$

Since (A) is obtained from a differential equations solver, the derivative $$\frac{\partial A}{\partial K_e}$$

cannot be computed analytically. Instead, it must be approximated by using finite differencing (FD) method:

$$\frac{\partial A}{\partial K_e} = \frac{A(K_e + \delta) - A(K_e)}{\delta}$$

where $\delta$ delta is a small step size.

Figure 20B:

FIG. 20B shows an application programming interface 2050 example computer code for generating computing instructions by a compiler for solving the one compartment model. A compiler could check a library database for pre-programmed analytical solutions for generating computing operations. Finding no pre-programing analytical solutions, the compiler could use numerical approaches such as finite difference methods described herein. Previous numerical approaches for solving these types of derivatives using generated computing operations had high error rates, especially in methods which should produce more accurate values, but they were more computationally complex and more susceptible to computer problems like rounding errors. For instance, common computing systems have limited memory size and need to round computed values for storage in memory. For instance, common computing systems include a 32-bit system or single precision memory storage that would only have 32 bits available for memory storage of a given computed value, a 64-bit, binary64 or double precision storage would only have 64 bits available for memory storage of a given computed value, and 128-bit system would only have 128 bits available for memory storage of a given computed value. Further complicating and limiting precision for a given stored value, some bits within available storage can be reserved for information about the value such as the sign of the stored value and exponent of the stored value.

FIG. 20A provides a table comparing processing of the same three derivative orders for $$\frac{\partial A}{\partial K_e}$$

using different finite differencing (FD) numerical analysis approaches. The computing system hardware used for computing in this example is a 64-bit double precision hardware, but computing systems could have more or less bits available. Method column 2001 defines the method used. Column 2002 shows a relative error rate for computation of first order derivatives derived according to:

$$\text{Relative Error} = \frac{\text{Computed Derivative} - \text{Analytical Derivative}}{\text{Analytical Derivative}}$$

Relative error rates for second order derivatives are shown in column 2003 and relative error rates for third order derivatives are shown in column 2004.

Computations for $FD_1$ are shown which uses a finite difference approach described herein using the weights in FIG. 17B for accuracy level 1. Under $FD_1$ the accuracy level cannot be changed from level 1. In this example, the function f is with respect to A in the one compartmental model above and θ is with respect to $K_e$:

$$\frac{\partial f(\theta)}{\partial \theta_i} \approx \frac{f(\theta + \delta_{e_i}) - f(\theta)}{\delta}$$

$$\frac{\partial^2 f(\theta)}{\partial \theta_i^2} \approx \frac{f(\theta + \delta_{e_i}) - 2f(\theta + \delta_{e_i}) + f(\theta)}{\delta^2}$$

$$\frac{\partial^3 f(\theta)}{\partial \theta_i^3} \approx \frac{f(\theta + 3\delta_{e_i}) - 3f(\theta + 2\delta_{e_i}) + 3f(\theta + \delta_{e_i}) - f(\theta)}{\delta^3}$$

In this $FD_1$ approach, step size δ is the same step size used in the computations and is a small value common to all θ values and dependent on the precision of f(θ) and/or a default compiler value. A common choice is square root of function precision (e.g., machine epsilon).

Recursive computing instructions can be generated for solving these equations according to the $FD_1$ approach, so that components of the first order derivative g(θ) can be used to derive the second order derivative, for example:

$$g(\theta) = \frac{\partial f(\theta)}{\partial \theta_i} \approx \frac{f(\theta + \delta_{e_i}) - f(\theta)}{\delta}$$

$$\frac{\partial g(\theta)}{\partial \theta_i} \approx \frac{g(\theta + \delta_{e_i}) - g(\theta)}{\delta}$$

$$\frac{\partial^2 f(\theta)}{\partial \theta_i^2} \approx \frac{f(\theta + 2\delta_{e_i}) - 2f(\theta + \delta_{e_i}) + f(\theta)}{\delta^2}$$

In an $FD_2$ approach, a step size Si depends on the absolute value of the $i^{th}$ parameter, such that there is not a common step size amongst θ as with the $FD_1$ approach:

$$\delta_i = \delta \times (1 + |\theta_i|)$$

$$\delta = \sqrt{\text{Function Precision}}$$

$$\frac{\partial f(\theta)}{\partial \theta_i} \approx \frac{f(\theta + \delta_i e_i) - f(\theta)}{\delta_i}$$

$$\frac{\partial^2 f(\theta)}{\partial \theta_i^2} \approx \frac{f(\theta + 2\delta_i e_i) - 2f(\theta + \delta_i e_i) + f(\theta)}{\delta_i^2}$$

$$\frac{\partial^3 f(\theta)}{\partial \theta_i^3} \approx \frac{f(\theta + 3\delta_i e_i) - 3f(\theta + 2\delta_i e_i) + 3f(\theta + \delta_i e_i) - f(\theta)}{\delta_i^3}$$

The $FD_2$ approach should increase the accuracy of $FD_1$ approach, but as shown due to existing computer processing limitations, it did not.

In the $FD_3$ approach the step size depends on θ and the order of the derivative. For instance, in the first order derivative, a square root is used for 81

$$\delta_{1i} = \delta_1 (1 + |\theta_i|)$$

$$\delta_1 = \sqrt{\text{Function Precision}}$$

$$\frac{\partial f(\theta)}{\partial \theta_i} \approx \frac{f(\theta + \delta_{1i} e_i) - f(\theta)}{\delta_{1i}}$$

In the second order derivative, a cube root is used for $\delta_2$ $$\delta_{2i} = \delta_2 \times (1 + |\theta_i|)$$

$$\delta_2 = \sqrt[3]{\text{Function Precision}}$$

$$\frac{\partial^2 f(\theta)}{\partial \theta_i^2} \approx \frac{f(\theta + 2\delta_{2i} e_i) - 2f(\theta + \delta_{2i} e_i) + f(\theta)}{\delta_{2i}^2}$$

In the third order derivative, a fourth root is used for $\delta_3$ $$\delta_{3i} = \delta_3 \times (1 + |\theta_i|)$$

$$\delta_3 = \sqrt[4]{\text{Function Precision}}$$

$$\frac{\partial^3 f(\theta)}{\partial \theta_i^3} \approx \frac{f(\theta + 3\delta_{3i} e_i) - 3f(\theta + 2\delta_{3i} e_i) + 3f(\theta + \delta_{3i} e_i) - f(\theta)}{\delta_{3i}^3}$$

Accuracy should be greater for the $FD_3$ approach over the $FD_1$ approach and the $FD_2$ approach. However, computational complexity is beginning to increase and recursive computing is no longer available using traditional methods, and so due to limitations of existing computing systems those accuracy advantages are unrealized.

In a fourth approach, $FD_4$ accuracy levels are considered in selecting the weights with greater accuracy numbers intended to correlate with more accurate answers. $FD_41$ has an accuracy level set to 1 and would look similar to FD3 and so understandably has similar processing values in table 2000. $FD_42$ would have accuracy level set to two (which should correlate to greater accuracy), so its weights for the first two derivate orders are shown as an example of the different weights:

$$\frac{\partial f(\theta)}{\partial \theta_i} \approx \frac{-(3/2)f(\theta) + 2f(\theta + \delta_{1i} e_i) - (1/2)f(\theta + 2\delta_{1i} e_i)}{\delta_{1i}}$$

$$\frac{\partial^2 f(\theta)}{\partial \theta_i^2} \approx \frac{2f(\theta) - 5f(\theta + \delta_{2i} e_i) - 1f(\theta + 3\delta_{2i} e_i)}{\delta_{2i}^2}$$

As the accuracy level is increased there is a greater level of computation complexity in higher level orders (e.g., $FD_46$ has an accuracy level set to 6), so relative error is significantly increasing rather than providing more accurate answers.

FIG. 20A illustrates complexity in computing operations in a table 2000 for this model. Embodiments herein can improve computations in approaches. Embodiments can improve derivative precision by using a delta that depends on both parameter and order and can use the finite difference coefficients (e.g., table 1750 shown in 17B). Use of pre-formulated coefficients as described with respect to FIGS. 17A-17B into the iterative differentiation process can address issues in standard techniques that often lead to rounding errors as precision requirements increase. By seamlessly incorporating these coefficients into a recursive workflow, the approach reduces some computational complexity and stabilizes calculations. These advantages are especially important as the complexity of the function changes (e.g., with a multivariate function).

FIGS. 21A-21I illustrate computing operations for a multivariate function with accuracy of 1. In FIG. 21A, the application programing interface 2100 includes a function foo that is a multi-variate function that has at least one variable and has other inputs that are constants and/or variables. For instance, the request to generate computing instructions can be responsive to generating different derivative orders for a computer model (e.g., a non-linear computer model). The computer model could have different variables or constants.

The multi-variate function is callable for different input sets by the computing system, or another computing system communicatively coupled with the computing system, taking as inputs "x", "a", "b", "SQRTTWOPI". A computing system can invoke it multiple times for different input sets with each input set including multiple inputs. Section 2104 shows different inputs including a value for variable "x" of "20.12" and values for each of the constants, "a", "b", "SQRTTWOPI". Section 2106 shows setting different deltas for different derivative orders.

FIGS. 21B-21I show application programming interface(s) that include computer code corresponding to the execution of the program for returning a response for function foo with the defined variables. For instance, FIG. 21B includes application programing interface 2110. FIG. 21C includes application programing interface 2120. FIG. 21D includes application programing interface 2130. FIG. 21E includes application programing interface 2140. FIG. 21F includes application programing interface 2150. FIG. 21G includes application programing interface 2160. FIG. 21H includes application programing interface 2170. FIG. 21I includes application programing interface 2180. As with the example in FIGS. 18A-18G, the computer code in these application programming interfaces uses different deltas as appropriate to the derivative order. For instance, FIG. 21C shows a delta set to 1E-6 and then the modified x value is shown as 20.120001 in section 2132 of FIG. 21D. As another example, FIG. 21D shows the delta set at 0.0001 and the modified x is shown in FIG. 21E in section 2142 as x=20.1201. The computer code in FIGS. 21A-21I also shows use of recursive weights in FIG. 17B as appropriate to the derivative orders and accuracy levels. For instance, section 2144 of FIG. 21E uses a recursive weight of "-2" for a second order derivative of accuracy level 1, and section 2172 of FIG. 21H uses a "-3" recursive weight for a third order derivative of accuracy level 1.

The analytical target value for this is -5.06314E-8. The result from the generated computer code for accuracy level 1 achieved a response of -5.057935E-8. In contrast using traditional methods the result would be -2858.736197. Accuracy can be improved further by increasing the accuracy level.

FIGS. 22A-22C illustrate a sampling of computing operations for a multivariate function in FIG. 21A with accuracy of 3. FIG. 22A shows an application programming interface 2200 with the accuracy level set in section 2106 to level 3. Otherwise, parameters are the same as in FIG. 21A. FIG. 22B shows an application programming interface 2210 with computer code corresponding to the start of execution of the program. FIGS. 22C-22E shows application programming interfaces 2220, 2230, and 2240 with computer code corresponding to the end of execution of the program with ending operations corresponding to a third order derivative. For instance, in FIG. 22C, application programming interfaces 2220 at section 2222 shows weight of "24.5" corresponding to "49/2" for accuracy level 3 for third order derivative in table 1750 of FIG. 17B. In FIG. 22D, application programming interfaces 2230 at section 2232 shows weight of "-10.25" corresponding to "-41/4" for accuracy level 3 for third order derivative in table 1750 of FIG. 17B. In FIG. 22E, application programming interfaces 2240 at section 2242 shows weight of "1.75" corresponding to "7/4" for accuracy level 3 for third order derivative in table 1750 of FIG. 17B. Section 2244 shows the result of -5.06314E-8, which is the exact analytical value. This shows that in one or more embodiments, using the improvements to computer processing described herein, numerical analysis can achieve the same precision as analytical analysis.

In some embodiments, accuracy levels can be set differently for different derivative orders. For instance, using the notation "_delta_.setdelta(order, delta, accuracy level)".

FIG. 23 illustrates an application programming interface 2300 for the multivariate function in FIG. 22A, but with different component level accuracy levels defined in section 2310. In this example, the first order derivative operations have an accuracy level of "1"; the second order derivative operations have an accuracy level of "3"; and the third order derivative operations have an accuracy level of "2". This can be useful in situations where there may need to be a tradeoff with processing complexity and accuracy, since higher level derivatives may require greater processing complexity.

As shown, embodiments described herein simplify the differentiation computation processing, while improving accuracy and adaptability. It enables compiler differentiators to handle complex models with much higher precision.

What is claimed is:

1. A computer-program product tangibly embodied in a non-transitory machine-readable storage medium, the computer-program product including system instructions operable to cause a computing system to:

receive an input set for a function to effectuate a response to the input set, wherein the input set comprises one or more inputs;

receive a request to generate computing operations to effectuate the response for the function to the input set;

responsive to the request to generate the computing operations:

generate a hashmap data structure, wherein the hashmap data structure indexes respective data storage associated with a respective key of one or more keys;

generate a first set of computing instructions to solve a first component for the function;

execute the first set of computing instructions;

generate a first hash key of the one or more of the keys, wherein the first hash key represents multiple executions of the first set of computing instructions;

store the first hash key in the hashmap data structure to index a storage location in the hashmap data structure;

generate a second set of computing instructions to solve a second component for the function;

execute the second set of computing instructions by using the first hash key to retrieve data indexed by the first hash key;

determine that an operation is a final execution of a last set of computing instructions for the function; and send, based on an output from the final execution, the response for the function to the input set.

2. The computer-program product of claim 1, wherein the system instructions are operable to cause the computing system to, responsive to the request to generate computing operations:

generate a second hash key of the keys, wherein the second hash key represents multiple executions of the second set of computing instructions;

store the second hash key in the hashmap data structure to index a storage location in the hashmap data structure;

generate a third set of computing instructions to solve a third component of the function; and
execute the third set of computing instructions by using the second hash key to retrieve data indexed by the second hash key; and
wherein the data indexed by the second hash key comprises:
a representation of the multiple executions of the first set of computing instructions, and
a given input of the input set to the function.

3. The computer-program product of claim 2,
wherein the system instructions are operable to cause the computing system to generate a delta associated with the third set of computing instructions;
wherein the input set comprise a first input;
wherein the first component is based on the first input that is input to a first variable of the function; and
wherein the third component is based on the first input in the input set, modified based on the delta, input to the first variable of the function.

4. The computer-program product of claim 3, wherein the delta is based on a:
basic forward finite difference method;
basic backward finite difference method; or
basic central finite difference method.

5. The computer-program product of claim 2,
wherein the data indexed by the first hash key comprises an indication of a first order derivative; and
wherein the data indexed by the second hash key comprises an indication of a second order derivative.

6. The computer-program product of claim 1, wherein the system instructions are operable to cause the computing system to:
receive a level of accuracy for computation of one or more components for the function; and
select a set of finite difference weights for recursion relations based on the level of accuracy.

7. The computer-program product of claim 1, wherein the system instructions are operable to cause the computing system to:
receive a set of objects for the computing system to generate a set of deltas, wherein each delta in the set of deltas is associated with a unique set of computing instructions and a unique member of the set of objects;
receive an accuracy level for one or more members of the set of objects; and
generate the computing operations based on the set of objects and the accuracy level.

8. The computer-program product of claim 1, wherein the system instructions are operable to cause the computing system to execute the second set of computing instructions by generating a computer indication to refrain from generating additional operations from the first set of computing instructions.

9. The computer-program product of claim 1,
wherein the request to generate the computing operations allows for recursive operations for numeric differentiation computations; and
wherein the system instructions are operable to cause the computing system to deviate from one or more recursive operations for the numeric differentiation computations.

10. The computer-program product of claim 1,
wherein the function is a multi-variate function callable for different input sets by the computing system or another computing system communicatively coupled with the computing system;
wherein each input set of the different inputs sets comprises multiple inputs for the multi-variate function; and
wherein the multiple inputs comprise at least one variable.

11. The computer-program product of claim 1, wherein the hashmap data structure indexes respective data storage by storing a pointer to a memory address in a hash value associated with a respective hash key.

12. The computer-program product of claim 1, wherein the system instructions are operable to cause the computing system to receive the request to generate the computing operations responsive to a request for generating different derivative orders for a non-linear computer model.

13. The computer-program product of claim 1,
wherein the first component and the second component relate to different derivative orders; and
wherein the final execution of the last set of computing instructions corresponds to a six-order derivative.

14. The computer-program product of claim 1, wherein the second set of computing instructions and the hashmap data structure comprise derivative operations represented in computer code comprising one or more symbols representing an order of derivatives.

15. The computer-program product of claim 1, wherein the hashmap data structure comprises a text string indicating derivative operations.

16. The computer-program product of claim 1, wherein the system instructions are operable to cause the computing system, responsive to the request to generate the computing operations, to:
determine to solve the function using a numerical analysis; and
generate the hashmap data structure, the first set of computing instructions, and the second set of computing instructions responsive to determining to solve the function using a numerical analysis.

17. The computer-program product of claim 1,
wherein the system instructions are operable to cause the computing system to receive the request to generate the computing operations at a compiler that translates computer instructions in a source code format into machine-executable code format;
wherein the request to generate the computing operations is in the source code format; and
wherein the first set of computing instructions and the second set of computing instructions are in the machine-executable code format.

18. The computer-program product of claim 1, wherein each key of the keys is based on the function, a first input in the input set, and a unique delta that is specific to a respective key and modifies the first input in the input set in the respective key.

19. A computer-implemented method comprising:
receiving an input set for a function to effectuate a response to the input set, wherein the input set comprises one or more inputs;
receiving a request to generate computing operations to effectuate the response for the function to the input set;
responsive to the request to generate the computing operations:
generating a hashmap data structure, wherein the hashmap data structure indexes respective data storage associated with a respective key of one or more keys;
generating a first set of computing instructions to solve a first component for the function;

executing the first set of computing instructions;
generating a first hash key of the one or more of the keys, wherein the first hash key represents multiple executions of the first set of computing instructions;
storing the first hash key in the hashmap data structure to index a storage location in the hashmap data structure;
generating a second set of computing instructions to solve a second component for the function;
executing the second set of computing instructions by using the first hash key to retrieve data indexed by the first hash key;
determining that an operation is a final execution of a last set of computing instructions for the function; and
sending, based on an output from the final execution, the response for the function to the input set.

20. The computer-implemented method of claim 19,
wherein the computer-implemented method comprises, responsive to the request to generate computing operations:
generating a second hash key of the keys, wherein the second hash key represents multiple executions of the second set of computing instructions;
storing the second hash key in the hashmap data structure to index a storage location in the hashmap data structure;
generating a third set of computing instructions to solve a third component of the function; and
executing the third set of computing instructions by using the second hash key to retrieve data indexed by the second hash key; and
wherein the data indexed by the second hash key comprises:
a representation of the multiple executions of the first set of computing instructions, and
a given input of the input set to the function.

21. The computer-implemented method of claim 20,
wherein the computer-implemented method comprises generating a delta associated with the third set of computing instructions;
wherein the input set comprises a first input;
wherein the first component is based on the first input that is input to a first variable of the function; and
wherein the third component is based on the first input in the input set, modified based on the delta, input to the first variable of the function.

22. The computer-implemented method of claim 19, wherein the computer-implemented method comprises:
receiving a level of accuracy for computation of one or more components for the function; and
selecting a set of finite difference weights for recursion relations based on the level of accuracy.

23. The computer-implemented method of claim 19, wherein the computer-implemented method comprises:
receiving a set of objects for generating a set of deltas, wherein each delta in the set of deltas is associated with a unique set of computing instructions and a unique member of the set of objects;
receiving an accuracy level for one or more members of the set of objects; and
generating the computing operations based on the set of objects and the accuracy level.

24. The computer-implemented method of claim 19, wherein the executing the second set of computing instructions comprises generating a computer indication to refrain from generating additional operations from the first set of computing instructions.

25. The computer-implemented method of claim 19,
wherein the request to generate the computing operations allows for recursive operations for numeric differentiation computations; and
wherein the computer-implemented method comprises deviating from one or more recursive operations for the numeric differentiation computations.

26. The computer-implemented method of claim 19,
wherein the function is a multi-variate function callable for different input sets by the computing system or another computing system communicatively coupled with the computing system;
wherein each input set of the different inputs sets comprises multiple inputs for the multi-variate function; and
wherein the multiple inputs comprise at least one variable.

27. The computer-implemented method of claim 19, wherein the receiving the request to generate the computing operations comprises receiving the request responsive to a request for generating different derivative orders for a non-linear computer model.

28. The computer-implemented method of claim 19,
wherein the receiving the request to generate the computing operations comprises receiving the request at a compiler that translates computer instructions in a source code format into machine-executable code format;
wherein the request to generate the computing operations is in the source code format; and
wherein the first set of computing instructions and the second set of computing instructions are in the machine-executable code format.

29. The computer-implemented method of claim 19, wherein each key of the keys is based on the function, a first input in the input set, and a unique delta that is specific to a respective key and modifies the first input in the input set in the respective key.

30. A computing device comprising processor and memory, the memory containing instructions executable by the processor wherein the computing device is configured to:
receive an input set for a function to effectuate a response to the input set, wherein the input set comprises one or more inputs;
receive a request to generate computing operations to effectuate the response for the function to the input set;
responsive to the request to generate the computing operations:
generate a hashmap data structure, wherein the hashmap data structure indexes respective data storage associated with a respective key of one or more keys;
generate a first set of computing instructions to solve a first component for the function;
execute the first set of computing instructions;
generate a first hash key of the one or more of the keys, wherein the first hash key represents multiple executions of the first set of computing instructions;
store the first hash key in the hashmap data structure to index a storage location in the hashmap data structure;
generate a second set of computing instructions to solve a second component for the function;
execute the second set of computing instructions by using the first hash key to retrieve data indexed by the first hash key;

determine that an operation is a final execution of a last set of computing instructions for the function; and send, based on an output from the final execution, the response for the function to the input set.

* * * * *